United States Patent
Bae et al.

(10) Patent No.: US 11,635,902 B2
(45) Date of Patent: Apr. 25, 2023

(54) STORAGE DEVICE PROCESSING STREAM DATA, SYSTEM INCLUDING THE SAME, AND OPERATION METHOD

(71) Applicant: SAMSUNG ELECTRONICS CO., LTD., Suwon-si (KR)

(72) Inventors: Duckho Bae, Seoul (KR); Dong-Uk Kim, Seoul (KR); Jaehong Min, Yongin-si (KR); Yong In Lee, Suwon-si (KR); Jooyoung Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 17/344,112

(22) Filed: Jun. 10, 2021

(65) Prior Publication Data
US 2021/0303189 A1    Sep. 30, 2021

Related U.S. Application Data

(63) Continuation of application No. 16/562,094, filed on Sep. 5, 2019, now Pat. No. 11,061,591.

(30) Foreign Application Priority Data

Nov. 2, 2018  (KR) .................. 10-2018-0133653
Mar. 8, 2019  (KR) .................. 10-2019-0027103

(51) Int. Cl.
*G06F 3/06* (2006.01)
*G06F 9/455* (2018.01)
*G06F 13/42* (2006.01)

(52) U.S. Cl.
CPC ............ *G06F 3/0632* (2013.01); *G06F 3/061* (2013.01); *G06F 3/0679* (2013.01);
(Continued)

(58) Field of Classification Search
CPC ....... G06F 13/4221; G06F 2009/45583; G06F 2213/0026; G06F 3/061; G06F 3/0679; G06F 3/0632; G06F 9/45558
(Continued)

(56) References Cited

U.S. PATENT DOCUMENTS 6,516,389 B1 ‡  2/2003  Uchihori ............. G06F 12/0862
                                                        711/113
8,094,160 B2 ‡  1/2012  Watanabe ............. H04N 19/61
                                                        345/557
(Continued)

FOREIGN PATENT DOCUMENTS

JP        1060506 B2        3/2008
JP        4060506 B2 ‡    3/2008   ......... G06F 12/0862
(Continued)

OTHER PUBLICATIONS

European Patent Office Search Report dated Mar. 26, 2020 Cited in European Application No. 19205624.0.‡

*Primary Examiner* — Hua J Song
(74) *Attorney, Agent, or Firm* — Volentine, Whitt & Francos, PLLC

(57) ABSTRACT

A storage device which is connected to a host using a virtual memory includes a solid state drive that receives a streaming access command including a logical block address (LBA) list and a chunk size, and prefetches stream data requested according to the LBA list and the chunk size from a nonvolatile memory device without an additional command. The prefetched stream data is sequentially loaded onto a buffer, and an in-storage computing block accesses a streaming region registered on the virtual memory to sequentially read the stream data loaded onto the buffer in units of the chunk size. The buffer is mapped onto a virtual memory address of the streaming region.

19 Claims, 17 Drawing Sheets

(52) U.S. Cl.
CPC ...... *G06F 9/45558* (2013.01); *G06F 13/4221* (2013.01); *G06F 2009/45583* (2013.01); *G06F 2213/0026* (2013.01)

(58) Field of Classification Search
USPC ......................................................... 711/154
See application file for complete search history.

(56) References Cited

U.S. PATENT DOCUMENTS

| | | | | |
|---|---|---|---|---|
| 8,601,086 | B2 ‡ | 12/2013 | Pandya | H04L 67/1097 709/212 |
| 8,719,455 | B2 ‡ | 5/2014 | Mejdrich | G06F 13/28 710/5 |
| 9,817,761 | B2 ‡ | 11/2017 | Ben-Shemesh | G06F 12/0862 |
| 9,916,269 | B1 ‡ | 3/2018 | Machulsky | G06F 13/4068 |
| 2002/0116597 | A1 ‡ | 8/2002 | Goodhue | G06F 9/3802 712/207 |
| 2003/0208660 | A1 ‡ | 11/2003 | van de Waerdt | G06F 12/0862 711/137 |
| 2013/0013851 | A1 ‡ | 1/2013 | Chang | G06F 12/0246 711/103 |
| 2015/0074337 | A1 ‡ | 3/2015 | Jo | G06F 3/0679 711/103 |
| 2016/0077976 | A1 ‡ | 3/2016 | Raikin | G06F 13/385 711/207 |
| 2016/0283116 | A1 ‡ | 9/2016 | Ramalingam | G06F 3/0656 |
| 2017/0109096 | A1 ‡ | 4/2017 | Jean | G06F 9/00 |
| 2017/0123985 | A1 ‡ | 5/2017 | Hooker | G06F 9/3802 |
| 2017/0228157 | A1 * | 8/2017 | Yang | G06F 3/0611 |
| 2018/0314421 | A1 * | 11/2018 | Linkovsky | G06F 3/0679 |

FOREIGN PATENT DOCUMENTS

| | | | | |
|---|---|---|---|---|
| JP | 1566737 | B2 | 10/2010 | |
| JP | 4566737 | B2 ‡ | 10/2010 | ......... G06F 12/0862 |
| KR | 1020030007536 | A ‡ | 1/2003 | |
| KR | 1020030007536 | A | 1/2003 | |
| KR | 100881748 | B1 ‡ | 2/2009 | |
| KR | 100881748 | B1 | 2/2009 | |
| KR | 1020150028610 | A ‡ | 3/2015 | |
| KR | 1020150028610 | A | 3/2015 | |
| KR | 101757098 | B1 ‡ | 7/2017 | ......... G06F 9/3455 |
| KR | 101757098 | B1 | 7/2017 | |

\* cited by examiner
‡ imported from a related application

SA_CMD

| Byte# | Byte3 | Byte2 | Byte1 | Byte0 |
|---|---|---|---|---|
| Dword0 | CID | | Fuse | Opcode |
| Dword1 | Namespace ID | | | |
| ⋮ | ⋮ | | | |
| DwordN | Stream ID | | | |
| DwordN+1 | LBA List | | | |
| DwordN+2 | Chunk Size | | | |
| DwordN+3 | Priority | | | |

STORAGE DEVICE PROCESSING STREAM DATA, SYSTEM INCLUDING THE SAME, AND OPERATION METHOD

CROSS-REFERENCE TO RELATED APPLICATIONS

This is a Continuation of U.S. application Ser. No. 16/562,094, filed Sep. 5, 2019, now U.S. Pat. No. 11,061,591 issued on Jul. 13, 2021, and a claim of priority under 35 U.S.C. § 119 is made to Korean Patent Application No. 10-2018-0133653 filed on Nov. 2, 2018 in the Korean Intellectual Property Office, and Korean Patent Application No. 10-2019-0027103 filed on Mar. 8, 2019 in the Korean Intellectual Property Office, the entire content of which are hereby incorporated by reference.

BACKGROUND

The present disclosure relates to electronic devices, and more particularly to storage devices that effectively store and output stream data, computing or electronic systems including such storage devices, and operation methods thereof.

Nowadays, various kinds of electronic devices are being widely used that perform unique functions depending on operations of electronic circuits included therein. Electronic devices may for example perform unique functions to provide services to a user.

A solid state drive (hereinafter referred to as an "SSD") is an example of a storage device. In response to a request of an external device (e.g., a host or a peripheral device), the SSD may store data or may output stored data. An SSD may provide a storage service to a user by storing data in a nonvolatile memory device (NVM) or outputting data stored in the nonvolatile memory device.

As information processing technologies develop and larger amounts of data are being generated, an important issue is how to quickly process large amounts of data at storage devices, while satisfying various user requirements such as performance and capacity of the storage devices. In particular, in a system that provides a service such as stream data, the transmission and reception of the stream data may cause a decrease in bandwidth of the storage device, thereby significantly reducing the quality of service. Accordingly, there is a need to improve the configuration and operation of storage devices to satisfy various user requirements of systems using stream data.

SUMMARY

Embodiments of the inventive concepts provide a technology for minimizing a decrease in bandwidth and minimizing a transmission delay time of a storage device, which occur in transmitting stream data, in a system adopting an interface to apply a sharing technique of a memory resource.

Embodiments of the inventive concepts provide a storage device connected to a host using a virtual memory. The storage device includes a solid state drive including a nonvolatile memory device and a buffer, the solid state drive receives a streaming access command including a logical block address (LBA) list and a chunk size, prefetches stream data from the nonvolatile memory block requested according to the LBA list and the chunk size without an additional command, and sequentially loads the prefetched stream data onto the buffer; and an in-storage computing block that accesses a streaming region registered on the virtual memory to sequentially read the stream data loaded onto the buffer in units of the chunk size. The buffer is mapped onto a virtual memory address of the streaming region.

Embodiments of the inventive concepts further provide a computing system includes a host that manages a memory resource by using a virtual memory space; a storage device including a nonvolatile memory device and a buffer, the storage device receives a streaming access command, prefetches stream data from the nonvolatile memory device requested according to an LBA list and a chunk size included in the streaming access command without an additional command, and sequentially loads the prefetched stream data onto the buffer; and a field programmable gate array (FPGA) that accesses a streaming region registered at the virtual memory space to sequentially read the stream data loaded onto the buffer in units of the chunk size.

Embodiments of the inventive concepts still further provide an operation method of a storage device which is connected to a host using a virtual memory space and which includes a nonvolatile memory device and a buffer. The operation method includes mapping, by the storage device, a physical address of the buffer onto an address range corresponding to a streaming window of the virtual memory space; receiving, at the storage device, a streaming access command including an LBA list corresponding to stream data and a management unit of the stream data; prefetching, by the storage device, the stream data from the nonvolatile memory device with reference to the LBA list to sequentially load the prefetched stream data onto the buffer by the management unit; accessing, at a target device, the streaming window of the virtual memory space; redirecting the access to the streaming window to the buffer; and transferring the stream data sequentially loaded onto the buffer to the target device by the management unit.

Embodiments of the inventive concepts also provide an electronic system that includes a host device including a virtual memory space; and a storage device including nonvolatile memory, a buffer, a controller and an in-storage computing block. The controller receives a streaming access command, and loads stream data sequentially from the nonvolatile memory to the buffer with reference to the streaming access command. The in-storage computing block accesses the virtual memory space to sequentially read the stream data loaded in the buffer.

BRIEF DESCRIPTION OF THE FIGURES

The above and other objects and features of the inventive concepts will become apparent in view of the following detailed description made with reference to the accompanying drawings.

DETAILED DESCRIPTION

Hereinafter, embodiments of the inventive concepts will be described in detail and clearly to such an extent that those (hereinafter referred to as "ordinary those") skilled in the art may easily implement the inventive concepts.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
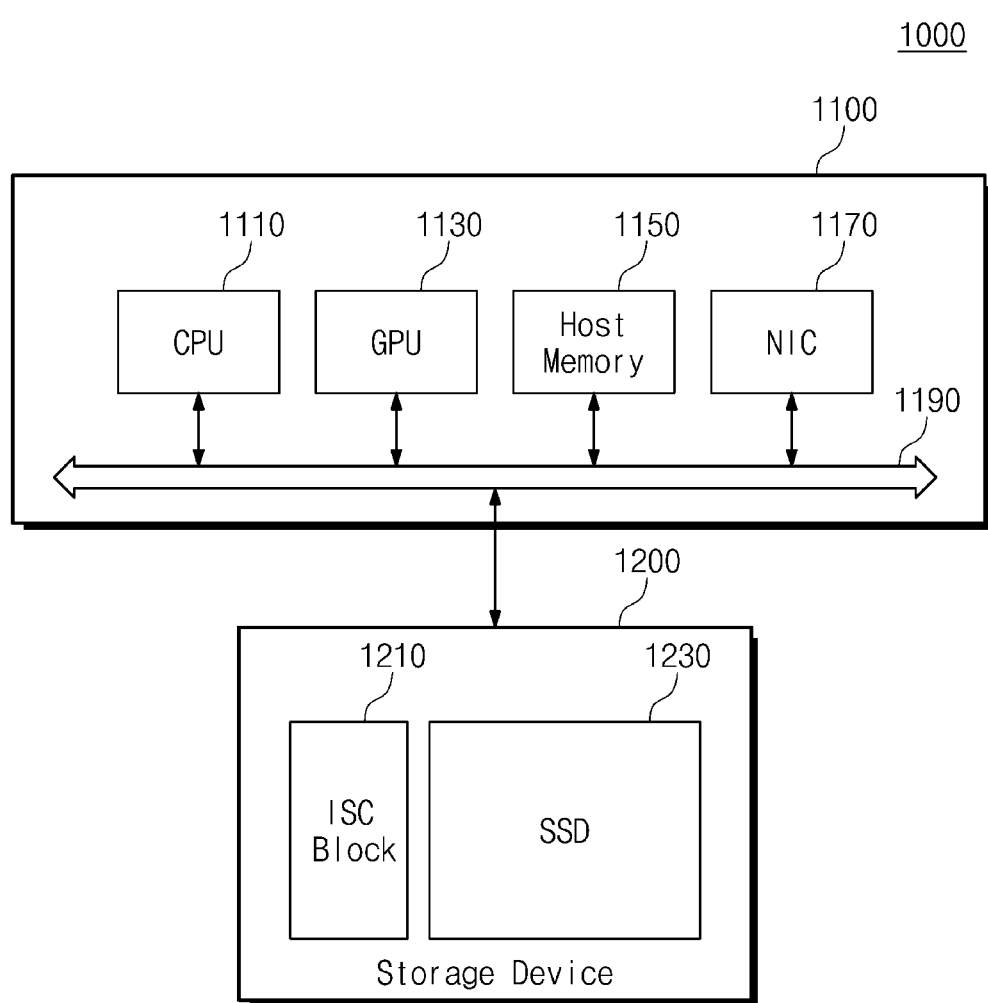
FIG. 1 illustrates a block diagram of an exemplary configuration of a computing system including a storage device according to embodiments of the inventive concepts.

FIG. 1 illustrates a block diagram of an exemplary configuration of a computing system including a storage device according to embodiments of the inventive concept. Computing system 1000 may be one of a desktop computer, a laptop computer, a tablet computer, a smartphone, a wearable device, a server, an electric vehicle, home applications, etc. Computing system 1000 may be generally characterized as an electronic system, device or apparatus. Referring to FIG. 1, the computing system 1000 may be roughly divided into a host device 1100 and a storage device 1200.

The host device 1100 may perform various arithmetic/logical operations for the purpose of controlling overall operations of the computing system 1000. The host device 1100 may include a central processing unit (CPU) 1110, a graphic processing unit (GPU) 1130, a host memory 1150, a network interface card (NIC) 1170, and an interface circuit 1190. Alternatively, the host device 1100 may be a device, which includes one or more processor cores, such as for example a general-purpose CPU, a dedicated application specific integrated circuit (ASIC), or an application processor.

The central processing unit 1110 executes a variety of software (e.g., an application program, an operating system, and a device driver) loaded onto the host memory 1150. The central processing unit 1110 may execute an operating system (OS) and application programs. The central processing unit 1110 may be implemented for example with a homogeneous multi-core processor or a heterogeneous multi-core processor. In particular, the central processing unit 1110 may request the storage device 1200 to process a data intensive work load operation such as a data base scan operation. In this case, the storage device 1200 of the inventive concepts may perform in-storage computing to provide result data to the host device 1100.

The graphics processing unit 1130 performs various graphic operations in response to a request of the central processing unit 1110. That is, the graphics processing unit 1130 may convert process-requested data to data suitable for a display. A streaming access to the storage device 1200 may also be requested by the graphics processing unit 1130. The graphics processing unit 1130 has an operation structure that is suitable for parallel processing in which similar operations are repeatedly processed. Accordingly, graphics processing units such as graphics processing unit 1130 are currently being developed to have a structure that may be used to perform various operations requiring high-speed parallel processing as well as graphic operations. For example, the graphics processing unit 1130 that processes a general-purpose operation as well as a graphic processing operation is called a general purpose computing on graphics processing units (GPGPU). The GPGPU may for example be used to analyze a molecular structure, to decrypt a code, or to predict a meteorological change in addition to video decoding.

The host memory 1150 may store data that are used to operate the computing system 1000. For example, the host memory 1150 may store data processed or to be processed by the host device 1100. The host memory 1150 may include volatile/nonvolatile memory such as for example static random access memory (SRAM), dynamic RAM (DRAM), synchronous DRAM (SDRAM), phase-change RAM (PRAM), ferro-electric RAM (FRAM), magneto-resistive RAM (MRAM), and resistive RAM (ReRAM).

The network interface card 1170 is a communication interface for connecting an Ethernet switch (not illustrated) or an Ethernet fabric with the computing system 1000. For example, in the case where the Ethernet switch corresponds to a wired LAN network, the network interface card 1170 may be implemented with a wired LAN card. Of course, even in the case where the Ethernet switch is a wireless LAN, the network interface card 1170 may be implemented with hardware that processes a communication protocol corresponding to the wireless LAN.

The interface circuit 1190 provides a physical connection between the host device 1100 and the storage device 1200. That is, the interface circuit 1190 may convert a command, an address, data, etc. which correspond to various access requests generated from the host device 1100, so to be suitable for an interface manner with the storage device 1200. The interface circuit 1190 may be configured according to any of a variety of different communication protocols such as for example Universal Serial Bus (USB), Small Computer System Interface (SCSI), Peripheral Component Interface express (PCIe), Advanced Technology Attachment (ATA), parallel ATA (PATA), serial ATA (SATA), serial attached SCSI (SAS), and universal flash storage (UFS).

The storage device 1200 may store data regardless of whether power is supplied. For example, the storage device 1200 may include storage mediums such as for example solid state drives (SSDs), secure digital (SD®) cards, embedded multimedia cards (eMMC®), or the like. In an embodiment, the storage device 1200 of the inventive concepts may include an in-storage computing block 1210 and an SSD 1230. The SSD 1230 may be characterized as an example of the storage medium.

The in-storage computing block 1210 may access the SSD 1230 in response to a request from the host device 1100. For example, the in-storage computing block 1210 may transfer a streaming access command (hereinafter referred to as "SA_CMD") to the SSD 1230 in response to a data request from the host device 1100. The streaming access command SA_CMD may include information of an LBA list, a stream ID, a chunk size, a priority, etc.

The in-storage computing block 1210 may process within the storage device 1200 stream data provided from the SSD 1230 in response to the streaming access command. Result data processed by the in-storage computing block 1210 may be returned to the host device 1100. The above operation of the in-storage computing block 1210 may make it possible to markedly improve (or minimize) a decrease in a bandwidth due to the exchange of stream data between the storage device 1200 and the host device 1100.

The SSD 1230 stores or outputs data in response to a request provided from the host device 1100 or the in-storage computing block 1210. The SSD 1230 may provide stream data in units of a requested data size in response to the streaming access command (e.g., a streaming read command or a streaming write command). For example, in the case where requested data are stored in a buffer (not illustrated), the SSD 1230 may allow a DMA engine (not illustrated) of the in-storage computing block 1210 to sequentially read data stored in the buffer. This will be described in detail hereinafter with reference to drawings.

A configuration of the storage device 1200 including the in-storage computing block 1210 of the inventive concepts, and a configuration of the computing system 1000 in which the storage device 1200 is included have been briefly described. The storage device 1200 of the inventive concepts may efficiently process stream data by using the streaming access command.

Figure 2:
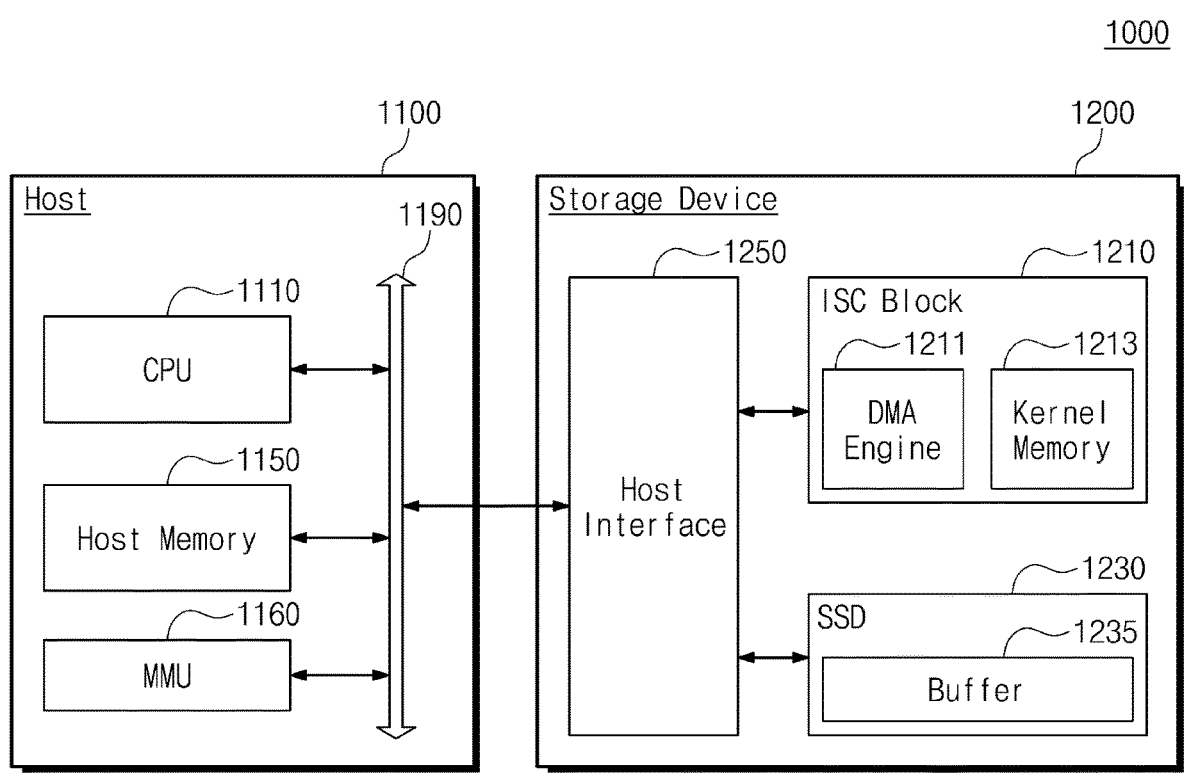
FIG. 2 illustrates a block diagram of an exemplary configuration of a host and a storage device of FIG. 1.

FIG. 2 illustrates a block diagram of an exemplary configuration of a host and a storage device of FIG. 1. Referring to FIG. 2, the host device 1100 and the storage device 1200 constitute the computing system 1000.

According to the inventive concepts, the host device 1100 may include the central processing unit 1110, the host memory 1150, the interface circuit 1190, and a memory management unit 1160 for the purpose of processing stream data. It should be understood that the host device 1100 further includes components such as the graphics processing unit 1130 and the network interface card 1170. However, for convenience of description, some functions of the components of the host device 1100 may not be here described, and/or some of the components may not be illustrated. The central processing unit 1110, the host memory 1150, and the interface circuit 1190 are substantially the same as those of FIG. 1, and thus, additional description may be omitted to avoid redundancy.

The host device 1100 may map a buffer 1235 of the SSD 1230 onto a virtual memory space of the host device 1100. In general, a storage device such as the SSD 1230 does not open the buffer 1235, which is a memory space for direct memory access (DMA), for any other device. Accordingly, the host device 1100 may register the buffer 1235 at a virtual memory space to manage the buffer 1235 through one map, and thus, the buffer 1235 may be freely accessible by a DMA engine 1211 of the in-storage computing block 1210. To this end, the host device 1100 may include the memory management unit 1160. During booting or initialization of the computing system 1000, the buffer 1235 may be opened to an external device for transmission of stream data by mapping a physical address region of the buffer 1235 of the SSD 1230 onto a virtual memory space. An access of an external device to the virtual memory space may be redirected to the buffer 1235 by the memory management unit 1160.

The storage device 1200 processes data provided from the SSD 1230 in an in-storage computing manner in response to a request of the host device 1100. The storage device 1200 may return a result of the in-storage computing to the host device 1100. To this end, the storage device 1200 may include the in-storage computing block 1210, the SSD 1230, and a host interface 1250.

In an embodiment, the in-storage computing block 1210 may include the DMA engine 1211 and a kernel memory 1213. For example, the in-storage computing block 1210 may be implemented with at least one of a processor or processor core, a field programmable gate array (FPGA), and an application specific integrated circuit (ASIC). The in-storage computing block 1210 may provide the streaming access command to the SSD 1230 in response to a request of the host device 1100. The in-storage computing block 1210 may process stream data transferred from the SSD 1230 in the in-storage computing manner and may transfer the processed data to the host device 1100. The DMA engine 1211 may read stream data of a chunk size loaded onto the buffer 1235 of the SSD 1230 and may transfer the read data to the kernel memory 1213. The chunk size defines a management unit of the stream data.

The SSD 1230 loads data, which are read from a storage medium in the unit of a chunk size defined by a command, onto the buffer 1235 in response to the streaming read command from the in-storage computing block 1210. As the buffer 1235 is mapped onto the virtual memory space of the host device 1100, the buffer 1235 is accessible by the DMA engine 1211 of the in-storage computing block 1210. Of course, the SSD 1230 may program data transferred in the unit of a chunk size in the buffer 1235 in response to a steaming write command from the in-storage computing block 1210.

The host interface 1250 is provided as a physical communication channel of the storage device 1200, which is used for data exchange with the host device 1100. The host interface 1250 may have an interfacing protocol supporting DMA functions of the in-storage computing block 1210 and the SSD 1230. For example, the buffer 1235 of the SSD 1230 may be managed in the virtual memory space by the memory management unit 1160 of the host device 1100 and the host interface 1250.

Figures 3A, 3B:
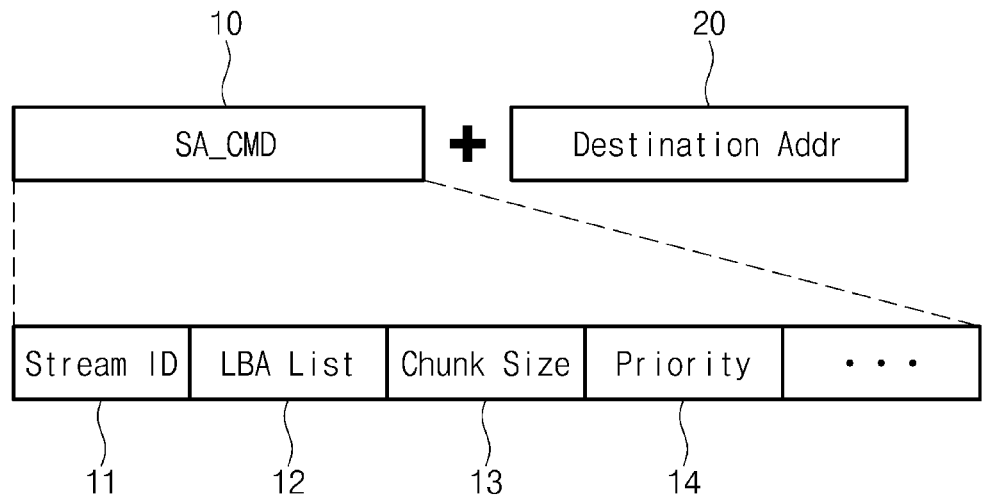
FIG. 3A illustrates a diagram showing attributes constituting a streaming access command according to embodiments of the inventive concepts.
FIG. 3B illustrates a table showing a way to configure a streaming access command in an NVMe interface protocol according to embodiments of the inventive concepts.
Figure 3C:
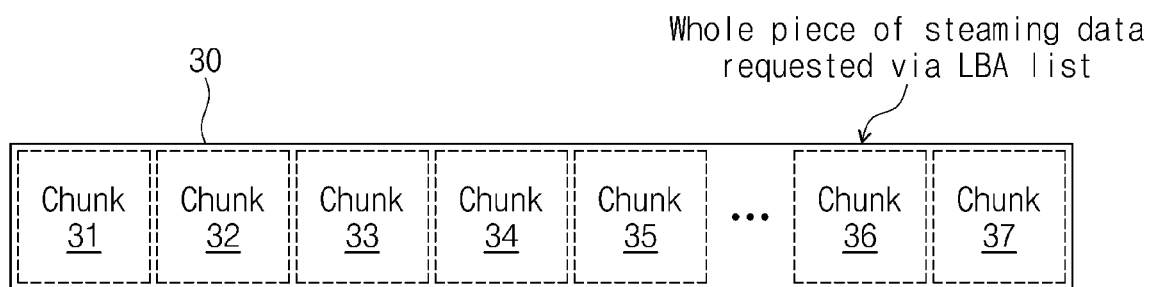
FIG. 3C illustrates a diagram showing stream data managed in units of chunk size according to embodiments of the inventive concepts.

FIGS. 3A, 3B, and 3C illustrate diagrams of a streaming access command according to embodiments of the inventive concepts. FIG. 3A shows attributes constituting the streaming access command SA_CMD. FIG. 3B is a table showing a way to configure the streaming access command SA_CMD in an NVMe interface protocol. FIG. 3C shows stream data managed in units of chunk size. Here, a command set of an NVM Express (NVMe) interface that is a register level interface will be exemplified as a command format. However, it should be understood that this exemplification is only for convenience of description, and in other embodiments other command formats may be used.

Referring to FIG. 3A, a streaming request provided from the outside may include the streaming access command SA_CMD (corresponding to reference numeral "10") and a destination address (Addr) 20. The streaming access command SA_CMD may be a streaming read command SR_CMD or a steaming write command SW_CMD. The destination address 20 indicates a memory position to which a DMA engine (not illustrated) included in the in-storage computing block 1210 will finally transfer requested stream data.

The streaming access command SA_CMD may include a stream ID 11, an LBA list 12, a chunk size 13, and a priority 14. The stream ID 11 includes identifier (ID) information for identifying multi-stream data. In the case of the multi-stream data, the stream ID 11 may be assigned to the multi-stream data when the multi-stream data are generated or in the process of transferring the multi-stream data. In the virtual memory space of the host device 1100, a streaming window may be assigned for each stream ID 11.

The LBA list 12 is a list of LBAs targeted for an access request through the streaming access command SA_CMD. For example, when LBAs LBA0 to LBA10000 are transferred through the LBA list 12, a physical address region of the SSD 1230 (refer to FIG. 2), which corresponds to the LBAs LBA0 to LBA10000, is accessed. In general, in the case of an NVMe-based SSD, a streaming command is provided by information such as an LBA start address and a sector count. However, the streaming access command SA_CMD of the inventive concepts may simultaneously provide a list of all LBAs corresponding to streaming data, thus minimizing an iterative command transfer.

The chunk size 13 indicates a transfer or input/output unit of stream data between the buffer 1235 of the SSD 1230 and the in-storage computing block 1210, or between the buffer 1235 and the external device. A prefetch operation may be performed on the buffer 1235 in the unit of the chunk size 13, and a DMA transfer operation may be made from the buffer 1235 to a destination in the unit of the chunk size 13. The chunk size 13 may be matched with a size of a streaming window to be assigned for stream data on the virtual memory space to be described later. The priority 14 includes priority information of the stream ID 11.

Required additional items for implementing the streaming access command SA_CMD of the inventive concepts in an NVMe interface protocol will be described with reference to FIG. 3B. In the NVMe protocol, basically, commands may be arranged in a 32-bit (Dword) unit.

The streaming access command SA_CMD may include field regions (e.g., Dword0 and Dword1) that normal commands have in common, and field regions DwordN to DwordN+3 for the streaming access command SA_CMD of the inventive concepts. The field regions Dword0 and Dword1 that normal commands have in common may include for example various elements CID, Fuse, Opcode, and Namespace ID. For example, the "CID (command ID)" indicates a command identifier, and the "Fuse" indicates whether to execute a command set in an atomic unit. The "Opcode" corresponds to a code value specifying an operation attribute of a command. The "Namespace ID" includes identifier information of a namespace.

In particular, the field regions DwordN to DwordN+3 for composing the streaming access command SA_CMD of the inventive concepts include a stream ID (DwordN), an LBA list (DwordN+1), a chunk size (DwordN+2), and a priority (DwordN+3). Attributes of the stream ID, the LBA list, the chunk size, and the priority may be the same as those described with reference to FIG. 3A. A way to construct the stream ID, the LBA list, the chunk size, and the priority for the streaming access command SA_CMD may be variously implemented. A reserved field of a command set associated with the NVMe protocol may be used to construct a streaming access command (SA_CMD) set. Alternatively, fields newly defined to construct a streaming access command (SA_CMD) set may be added to construct the streaming access command SA_CMD.

Referring to FIG. 3C, the whole piece of data 30 requested for streaming may for example be managed in the unit of a plurality of chunks 31 to 37. The whole piece of requested data may be defined based on an LBA list included in the streaming access command SA_CMD. The whole piece of data 30 may include a plurality of partitioned data each having a chunk size. The storage device 1200 may manage data divided in the unit of a chunk size for the purpose of outputting or receiving the whole piece of data 30.

Figure 4:
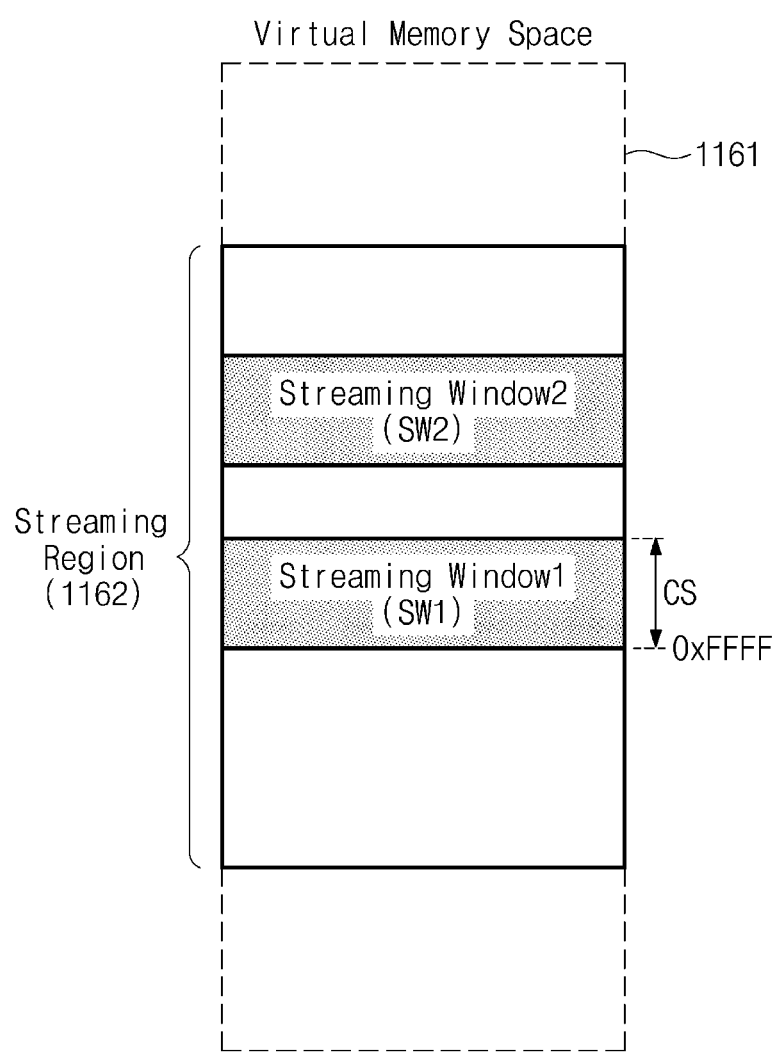
FIG. 4 illustrates a memory map of a virtual memory space of a host.

FIG. 4 illustrates a memory map of a virtual memory space of a host. Referring to FIG. 4, a virtual memory space 1161 of the host device 1100 may include a memory region of the buffer 1235 of the SSD 1230.

Memory spaces of various peripheral devices may be registered in the virtual memory space 1161 of the host device 1100, which is managed by the memory management unit 1160. In particular, in the computing system 1000 including the storage device 1200 having an in-storage computing function of the inventive concepts, a partial memory region or the whole memory region of the buffer 1235 in the SSD 1230 may be registered at the virtual memory space 1161.

In general, the host memory 1150 that is provided as a main memory of the host device 1100 may be a shared memory accessible by peripheral devices, but the buffer 1235 of storage such as the SSD 1230 may not be shared by peripheral devices due to security or any other causes. Accordingly, it may be difficult for the DMA engine 1211 of the in-storage computing block 1210, or a DMA engine of the host device 1100 or each peripheral device, to access the buffer 1235 directly. For a data transfer according to the streaming access command SA_CMD of the inventive concepts, the buffer 1235 of the SSD 1230 should be shared by a DMA engine of a target device. In the inventive concepts, the virtual memory space 1161 of the host device 1100 may be used such that the buffer 1235 of the SSD 1230 is shared by the DMA engine of the target device.

In the case of the SSD 1230 using the NVMe-based interface, with regard to the virtual memory space 1161, registration may be performed by using a base address register BAR. For example, in the case where the buffer 1235 is registered at the base address register BAR in a booting sequence or an initialization operation of the computing system 1000, the host device 1100 or peripheral devices, which access the buffer 1235, may access an address registered at the virtual memory space 1161. In the case where there is made an access to a virtual address assigned on the virtual memory space 1161, afterwards, the virtual address is redirected to the buffer 1235 by the memory management unit 1160. As such, the in-storage computing block 1210, the host device 1100, or any other peripheral devices may share the buffer 1235 of the SSD 1230 through the virtual memory space 1161.

The virtual memory space 1161 of the host device 1100 includes a streaming region 1162 that corresponds to a virtual address range for managing stream data of the buffer 1235 of the SSD 1230. The streaming region 1162 may include at least one streaming window corresponding to a chunk size included in the streaming access command SA_CMD. The streaming window is provided in an input/output unit corresponding to a stream identifier ID included in the streaming access command SA_CMD. That is, streaming windows, the number of which corresponds to the number of stream IDs of multi-stream data, may be assigned to the streaming region 1162.

For example, streaming windows may be set to the virtual memory space 1161 as much as the number of stream IDs of stream data to be read from or programmed in the SSD 1230. In the case where the DMA engine 1211 of the in-storage computing block 1210 intends to read data corresponding to a streaming window SW1, the DMA engine 1211 may access a virtual memory space corresponding to a chunk size CS and an address 0xFFFF of the virtual memory space 1161. In this case, the access of the DMA engine 1211 may be redirected to the buffer 1235 of the SSD 1230 by the memory management unit 1160.

Figure 5:
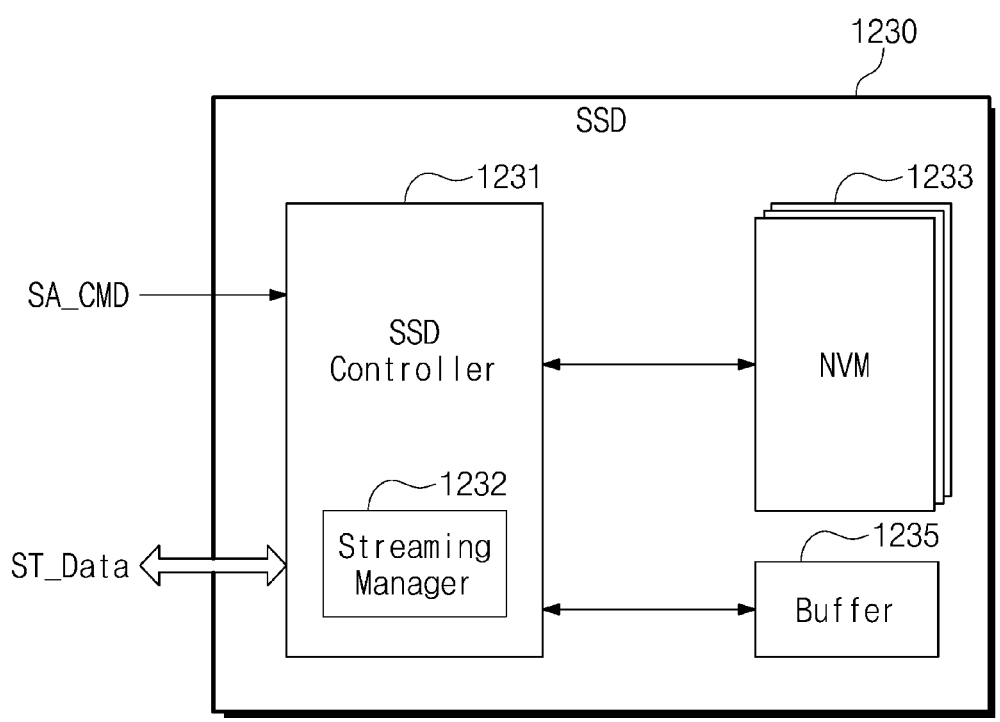
FIG. 5 illustrates a block diagram of an exemplary configuration of an SSD according to embodiments of the inventive concepts.

FIG. 5 illustrates a block diagram of an exemplary configuration of an SSD according to embodiments of the inventive concepts. Referring to FIG. 5, the SSD 1230 may include an SSD controller 1231, a nonvolatile memory device(s) 1233, and the buffer 1235.

The SSD controller 1231 may provide interfacing between an external device and the SSD 1230. The SSD controller 1231 accesses the nonvolatile memory device 1233 with reference to a stream ID, an LBA list, and a chunk size CS included in the streaming access command SA_CMD provided from the outside. For example, in the case where the streaming access command SA_CMD corresponds to a read command, the SSD controller 1231 prefetches data corresponding to the LBA list from the nonvolatile memory device 1233 in the unit of the chunk size CS and loads the prefetched data onto the buffer 1235. In contrast, in the case where the streaming access command SA_CMD corresponds to a write command, the SSD controller 1231 may program write data loaded onto the buffer 1235 from the outside in the unit of the chunk size CS in the nonvolatile memory device 1233.

In particular, the SSD controller 1231 may include a streaming manager 1232 for managing the nonvolatile memory device 1233 and the buffer 1235 based on the streaming access command SA_CMD. The streaming manager 1232 parses the streaming access command SA_CMD and prefetches stream data corresponding to the LBA list from the nonvolatile memory device 1233 to the buffer 1235 in the unit of the chunk size CS. Also, the streaming manager 1232 may manage the buffer 1235 such that a target device reads stream data ST_Data from the buffer 1235 in the unit of the chunk size CS.

Figure 6:
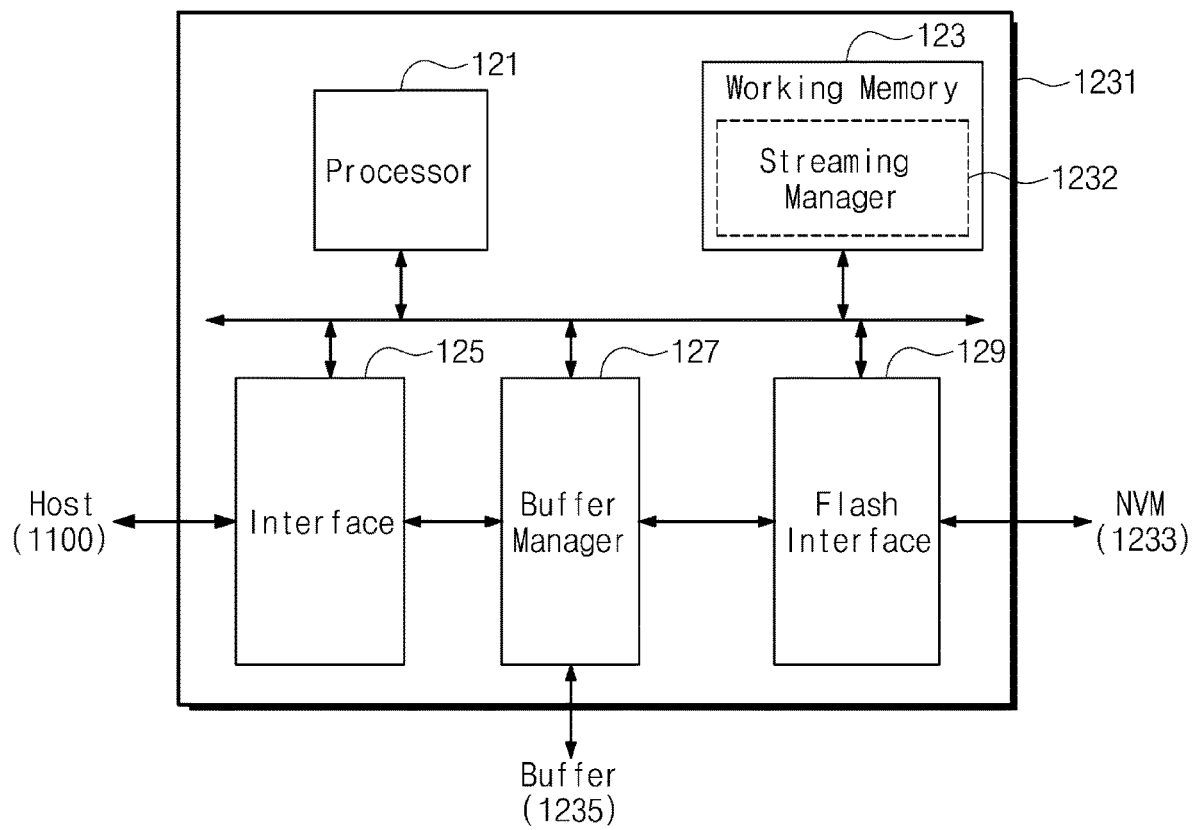
FIG. 6 illustrates a block diagram of an exemplary configuration of an SSD controller of FIG. 5.

FIG. 6 illustrates a block diagram of an exemplary configuration of an SSD controller of FIG. 5. Referring to FIG. 6, the SSD controller 1231 includes a processor 121, a working memory 123, an interface 125, a buffer manager 127, and a flash interface 129. In this embodiment, the streaming manager 1232 that processes a streaming command of the inventive concepts may be implemented with a firmware or software module for example.

The processor 121 may execute the streaming manager 1232 loaded onto the working memory 123. As the streaming manager 1232 is executed, the streaming manager 1232 transfers various control information necessary to perform a read/write operation to registers of the interface 125 and flash interface 129. For example, in the case where the streaming access command SA_CMD is received from the outside, the streaming access command SA_CMD is stored in a command register (not illustrated) of the interface 125. The interface 125 may notify the processor 121 that the read/write command is input to the processor 121, based on the stored command. The processor 121 may parse the streaming access command SA_CMD transferred to the interface 125 to control the buffer manager 127 and the flash interface 129.

As the streaming manager 1232 is executed, the processor 121 reads stream data corresponding to an LBA list from the nonvolatile memory device 1233. The processor 121 prefetches stream data from the nonvolatile memory device 1233 in the units of the chunk size CS and loads the prefetched stream data onto the buffer 1235. The processor 121 may inform an external device of a head pointer and/or a tail pointer of the stream data loaded onto the buffer 1235. The processor 121 detects an access of an external device to the buffer 1235 to manage the head pointer and the tail pointer of the buffer 1235. In addition, the processor 121 may manage a streaming window of the virtual memory space 1161, onto which requested stream data will be loaded in the unit of a chunk size.

The working memory 123 may store data that are used to drive the SSD controller 1231. For example, various firmware to be executed by the SSD controller 1231 may be loaded onto the working memory 123. For example, a flash translation layer (FTL) to be executed by the processor 121 or a firmware image such as the streaming manager 1232 of the inventive concepts may be loaded onto the working memory 123 and may be executed by the processor 121.

The interface 125 provides a physical connection between the host device 1100 or an external device (through the host interface 1250 shown in FIG. 2) and the SSD 1230. That is, the interface 125 provides interfacing with the SSD 1230, which complies with a bus format of the host device 1100. The bus format of the host device 1100 may include for example at least one of Universal Serial Bus (USB), Small Computer System Interface (SCSI), Peripheral Component Interface express (PCIe), Advanced Technology Attachment (ATA), parallel ATA (PATA), serial ATA (SATA), a serial attached SCSI (SAS), NVMe, and NVMe over Fabrics (NVMe-oF).

The buffer manager 127 controls read and write operations of the buffer 1235 (refer to FIG. 5). For example, the buffer manager 127 temporarily stores write data or read data in the buffer 1235. For example, the buffer manager 127 may identify and manage a memory region of the buffer 1235 in the unit of a stream under control of the processor 121. Under control of the processor 121, the buffer manager 127 may update a head pointer or a tail pointer of the buffer 1235 implemented with a ring buffer or a circular buffer and may output the updated pointer to the outside.

The flash interface 129 exchanges data with the nonvolatile memory device 1233. The flash interface 129 writes data transferred from the buffer 1235 in the nonvolatile memory device 1233. The flash interface 129 may transfer the data read from the nonvolatile memory device 1233 to the buffer 1235.

The SSD controller 1231 according to embodiments of the inventive concepts may manage the buffer 1235 in the unit of the chunk size CS in response to the streaming access command SA_CMD. Status information of the buffer 1235 may be transferred to the outside of the SSD 1230 by the SSD controller 1231. The status information of the buffer 1235 transferred to the outside may be referenced for a DMA operation of a target device that transfers data in the unit of the chunk size CS.

Figure 7:
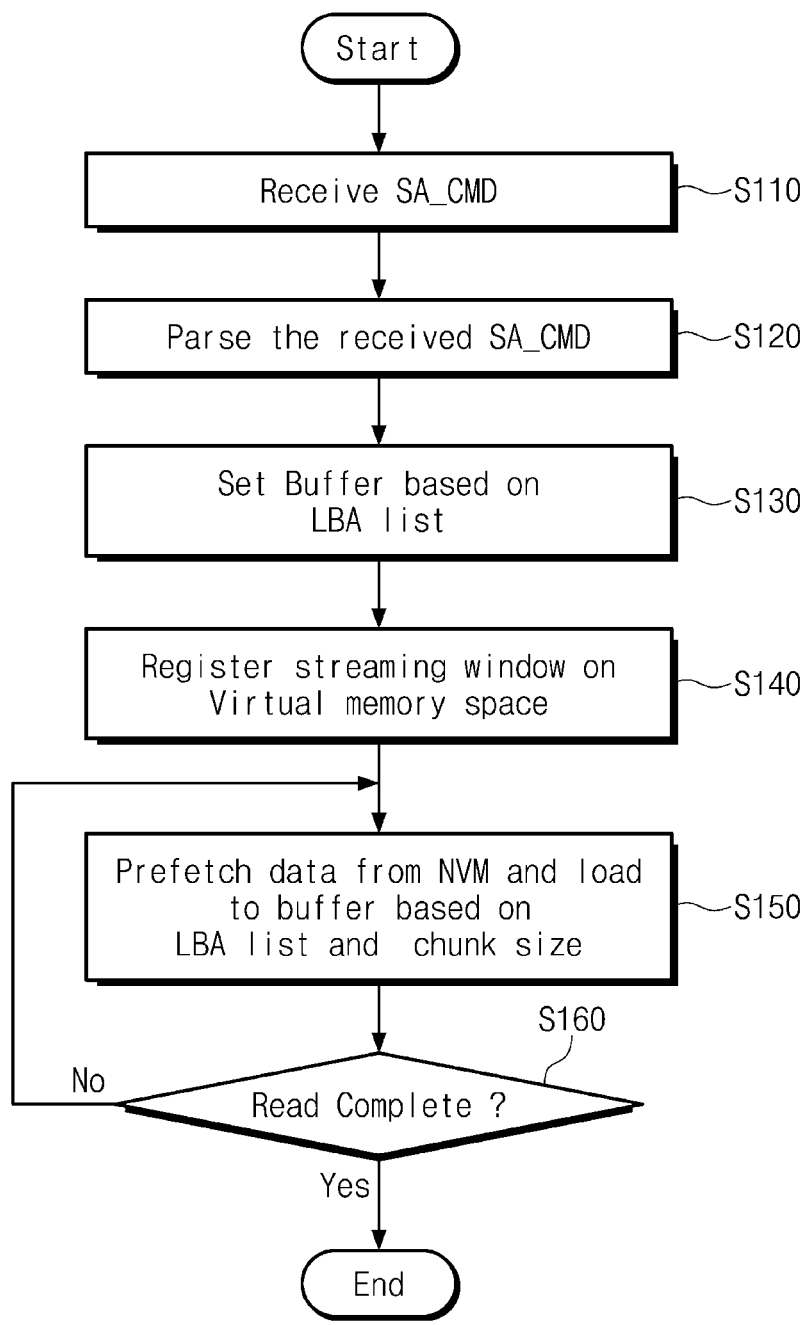
FIG. 7 illustrates a flowchart of an operation of a streaming manager of FIG. 6 according to embodiments of the inventive concepts.

FIG. 7 illustrates a flowchart of an operation of a streaming manager of FIG. 6 according to embodiments of the inventive concepts. Referring to FIG. 7, when the streaming access command SA_CMD of the inventive concepts is received, a control operation for transferring stream data of the streaming manager 1232 of the SSD 1230 starts.

In operation S110, the SSD 1230 receives the streaming access command SA_CMD provided from the host device 1100 or any other peripheral device. In this case, the streaming access command SA_CMD may include values of a stream ID, an LBA list, a chunk size, and a priority. In addition, a destination address of stream data to be transferred may be provided together with the streaming access command SA_CMD. However, a configuration of the streaming access command SA_CMD of the inventive concepts is not limited thereto. It should be well understood that various parameters for efficiently controlling the buffer 1235 and a prefetch operation for processing of multi-stream data may be included in or added to the streaming access command SA_CMD.

In operation S120, the streaming manager 1232 parses the received streaming access command SA_CMD. The streaming manager 1232 may identify the whole piece of data to be read and data output just prior to receipt of the streaming access command SA_CMD, based on an LBA list obtained by parsing the streaming access command SA_CMD.

In operation S130, the streaming manager 1232 sets a head pointer HP and a tail pointer TP of the buffer 1235, based on information about the data output until just prior to receipt of the streaming access command SA_CMD. When the host device 1100 or an external device accesses a streaming window of the virtual memory space 1161 based on the head pointer HP or the tail pointer TP of the buffer 1235, the access of the host device 1100 or the external device may be redirected to the buffer 1235 by the memory management unit 1160.

In operation S140, the streaming manager 1232 updates or registers the streaming window at the streaming region 1162 reserved on the virtual memory space 1161. That is, the streaming window may correspond to a size (i.e., a chunk size) of data, which are exchanged between the buffer 1235 and the target device, on the virtual memory space 1161. In some embodiments, it is possible to perform operation S140 in an initialization operation of a computing system.

In operation S150, the streaming manager 1232 prefetches requested data from the nonvolatile memory device 1233. The prefetched data are stored in the buffer 1235. In the case where the buffer 1235 is managed by using a ring buffer, the head pointer HP of the buffer 1235 may be updated after the prefetched data are stored in the buffer 1235. In addition, in the case where it is detected that the prefetched data in the buffer 1235 are read by the host device 1100 or the external device, the streaming manager 1232 may move the tail pointer TP of the buffer 1235.

In operation S160, the streaming manager 1232 determines whether the whole piece of data requested through the streaming access command SA_CMD are transferred to a destination address. That is, the streaming manager 1232 compares the provided LBA list with the data already output to determine whether the requested stream data are completely serviced. When it is determined that the requested data are completely transferred to the target device (Yes in S160), overall operations of the SSD 1230 corresponding to the streaming access command SA_CMD end. When it is determined that data from among the requested data are not yet transferred to the target device (No in S160), the process returns to operation S150.

An operation in which the streaming manager 1232 prefetches and outputs stream data in response to the streaming access command SA_CMD is described above. An embodiment is described whereby the streaming manager 1232 operates in the form of a software module, but the inventive concepts are not limited thereto. In addition, an order of operations of the above flowchart is not limited as shown of FIG. 7, and it should be understood that the order of the operations may be changed.

Figure 8:
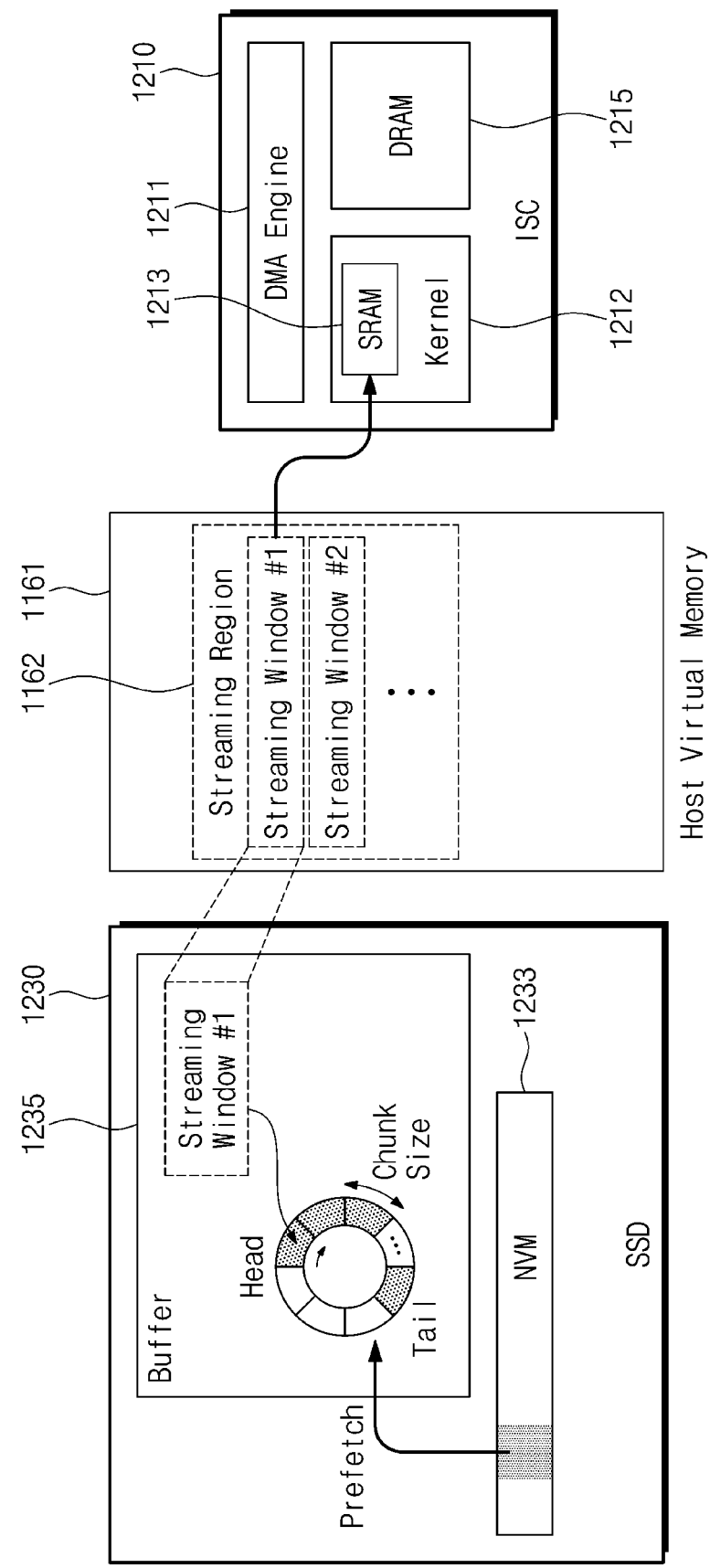
FIG. 8 illustrates a block diagram of a path over which data are transferred according to a streaming read command, according to embodiments of the inventive concepts.

FIG. 8 illustrates a block diagram of a path over which data are transferred according to a streaming read command, according to embodiments of the inventive concepts. Referring to FIG. 8, the SSD 1230 prefetches data from the nonvolatile memory device 1233 to the buffer 1235 based on LBA lists of the streaming access command SA_CMD. The in-storage computing block 1210 may access the streaming window Streaming Window #1 registered at the virtual memory space 1161 of the host device 1100 such that data of the buffer 1235 are transferred directly to an SRAM (i.e., kernel memory) 1213 of a kernel 1212. Here, it is assumed that the streaming access command SA_CMD is a streaming read command.

First, in response to the streaming access command SA_CMD, the SSD 1230 reads data from the nonvolatile memory device 1233 based on an LBA list and a chunk size. This operation is controlled by the streaming manager 1232 that is driven on the SSD 1230. The prefetch from the nonvolatile memory device 1233 to the buffer 1235 is performed with reference to the chunk size CS provided by the streaming access command SA_CMD. That is, data are loaded onto or output from the buffer 1235 in the unit of the chunk size CS. Accordingly, in the case where the buffer 1235 is managed in the form of a ring buffer, the head pointer HP and the tail pointer TP of the buffer 1235 may move in the unit of a chunk size. However, it should be well understood that the data structure of the buffer 1235 may be variously changed or modified without limitation to the example of FIG. 8.

Data prefetched to the buffer 1235 may be enqueued between a head and a tail of a circular queue. The prefetched data may be enqueued in the circular queue in the unit of a chunk size.

The streaming manager 1232 of the SSD 1230 may manage the streaming region 1162 and a streaming window registered at the virtual memory space 1161. In the virtual memory space 1161, as one of sharing ways, the streaming region 1162 may allow an external device or the host device 1100 to access the stream data loaded onto the buffer 1235. Accordingly, a peripheral device or the in-storage computing block 1210 may access the first streaming window Streaming Window #1 registered at the virtual memory space 1161 without restriction. Here, the first streaming window Streaming Window #1 and the second streaming window Streaming Window #2 correspond to different streaming IDs, respectively. That is, chunks of different streaming ID prefetched to the buffer 1235 may be assigned to the first streaming window Streaming Window #1 and the second streaming window Streaming Window #2, respectively.

When the in-storage computing block 1210 accesses the first streaming window Streaming Window #1, the access may be redirected to a memory region of the buffer 1235, in which a corresponding chunk is stored. This redirection may be managed by the memory management unit 1160 or the central processing unit 1110 of the host device 1100. A streaming window may enable an access to enqueued data of a chunk size.

Data that are loaded onto the buffer 1235 of the SSD 1230 in the unit of a chunk size by the streaming access command SA_CMD may be transferred to a destination, such as the SRAM 1213 of the kernel 1212, by the in-storage computing block 1210. That is, as the buffer 1235 may be mapped onto the virtual memory space 1161 of the host device 1100, the buffer 1235 may be accessed by the in-storage computing block 1210 without restriction. As the buffer 1235 is mapped onto the virtual memory space 1161 of the host device 1100, the DMA engine 1211 of the in-storage computing block 1210 may transfer stream data to a destination memory (e.g., the SRAM 1213) without passing through a DRAM 1215.

Until the whole piece of requested data are obtained, the in-storage computing block 1210 may repeatedly obtain enqueued data of a chunk size through the streaming window. To this end, the SSD 1230 may update a pointer of the buffer 1235 corresponding to a streaming window (e.g., a first streaming window) registered at the virtual memory space 1161 whenever the in-storage computing block 1210 obtains enqueued data. For example, whenever the in-storage computing block 1210 obtains enqueued data, the SSD 1230 may change a value of the head pointer HP of the buffer 1235 such that the head pointer HP of the buffer 1235 directs enqueued data to be read next.

The in-storage computing block 1210 accesses the virtual memory space 1161 of the host device 1100 corresponding to the streaming window Streaming window #1. In this case, the access is redirected to a region of the buffer 1235 corresponding to the head pointer HP by the central processing unit 1110 of the host device 1100 or the memory management unit 1160 provided separately. Stream data of a chunk size provided from the buffer 1235 may be transferred directly to the SRAM 1213 of the kernel 1212.

In the case where the in-storage computing block 1210 obtains data prefetched to the buffer 1235, the head pointer HP of the circular queue may be updated to direct next enqueued data. Meanwhile, in some cases, while the in-storage computing block 1210 accesses the enqueued data, the SSD 1230 may prefetch different data from a memory device to the buffer 1235. In this case, the tail pointer TP of the circular queue may be updated to direct the newly prefetched data.

As such, the in-storage computing block 1210 may sequentially obtain stream data divided in the unit of a chunk size by using the single streaming access command SA_CMD. In this case, until the whole piece of intended data are obtained, the in-storage computing block 1210 may repeatedly obtain enqueued data of a chunk size through the streaming window. In the case where the in-storage computing block 1210 obtains the whole piece of intended data, a streaming read operation may be completed.

In some cases, an access may be requested from the in-storage computing block 1210 before stream data are prefetched to the buffer 1235 of the SSD 1230. In this case, the SSD 1230 may delay processing of the request of the in-storage computing block 1210 until data are prefetched to the buffer 1235. In some cases, an additional streaming read command may be received in a state where the circular queue is fully filled with prefetched data. In this case, the SSD 1230 may delay processing of the additional streaming read command until all or a part of the circular queue is empty.

According to the above embodiments, stream data may be buffered in the buffer 1235 of the SSD 1230, instead of being transferred to the host memory 1150 (refer to FIG. 2) of the host device 1100. Accordingly, a memory space of the host memory 1150 of the inventive concept may not be required. Overhead of the computing system 1000 may thus be decreased. The SSD 1230 may buffer stream data divided in the unit of a chunk size instead of buffering the whole piece of data at the same time. Accordingly, a buffer resource of the SSD 1230, which may be characterized as a memory resource, may be efficiently used.

In addition, the buffer 1235 of the SSD 1230 may be accessible from an external device, and divided data of a chunk size are buffered in the accessible buffer 1235. Accordingly, the in-storage computing block 1210 may manage the whole piece of intended data obtained from the buffer 1235 of the SSD 1230 in the SRAM 1213 of the kernel 1212. This may prevent the DMA engine 1211 from repeatedly issuing a memory access request, thus improving the performance of the in-storage computing block 1210.

To this end, the buffer 1235 of the SSD 1230 may include a memory region that is accessible from an external device, and prefetched data of a chunk size may be managed in the accessible memory region. In some cases, all the regions of the buffer 1235 of the SSD 1230 may be accessible from the external device. Alternatively, only some regions of the buffer 1235 of the SSD 1230 may be accessible from the external device, and the remaining regions may be inaccessible for security.

In the case where a chunk size is great, a latency may increase when data are exchanged, but a bandwidth to exchange each divided data may increase, and the performance of communication may be improved. In contrast, in the case where a chunk size is small, a latency may decrease when data are exchanged. The chunk size may be appropriately selected in consideration of the above conditions.

In the case where a size of a circular queue is large, a buffer may be implemented with a high-capacity buffer, and a plurality of data may be enqueued at the same time, and the performance of communication may be improved. In contrast, in the case where a size of a circular queue is small, the buffer may be implemented with a small-capacity buffer. The size of the circular queue may be appropriately selected in consideration of the above conditions.

Figure 9:
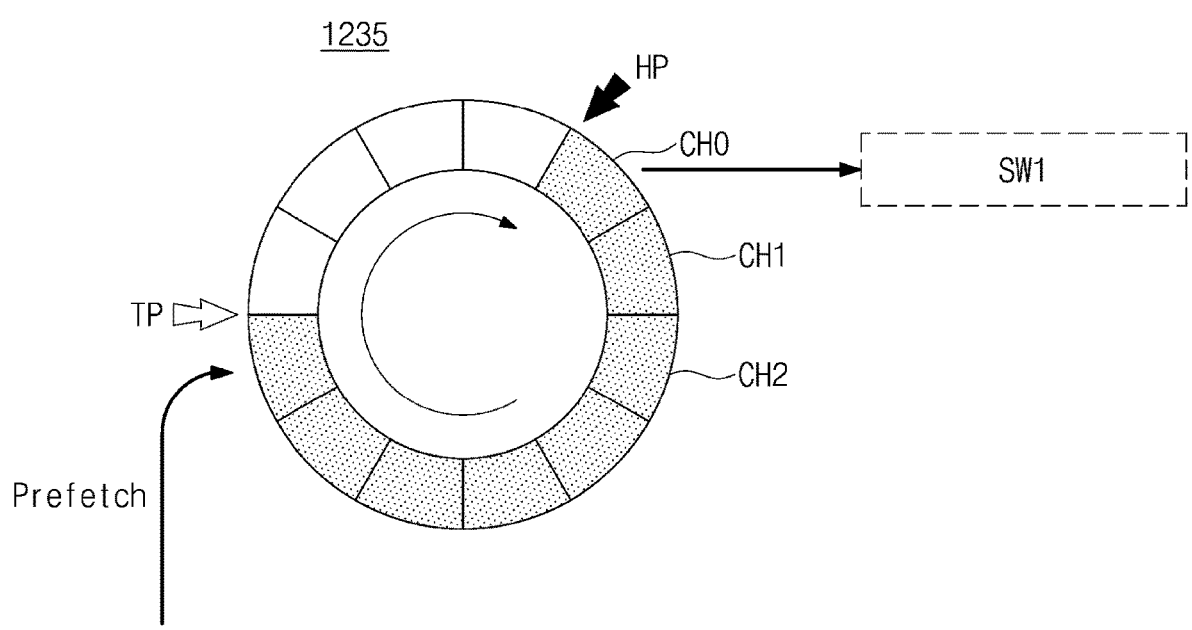
FIG. 9 illustrates a diagram showing how to manage a buffer having a circular queue shape, according to embodiments of the inventive concepts.

FIG. 9 illustrates a diagram showing how to manage a buffer having a circular queue shape, according to embodiments of the inventive concepts. Referring to FIG. 9, a region of the buffer 1235 in which stream data are stored may be managed in the form of a ring buffer of a circular queue type.

As the streaming manager 1232 is driven, data of a chunk size prefetched from the nonvolatile memory device 1233 are stored in the buffer 1235 as chunk data CH0, CH1, CH2, etc. When the prefetch operation is completed, the streaming manager 1232 or the buffer manager 127 updates the tail pointer TP. Likewise, when chunk data CH0 are transferred to an external device or the in-storage computing block 1210 which accesses the streaming window SW1, the head pointer HP of the buffer 1235 may move as much as a chunk size. Afterwards, an access to the streaming window SW1 may be redirected to chunk data CH1 corresponding to a position of the updated head pointer HP. As such, pointers of the buffer 1235 move.

Figure 10:
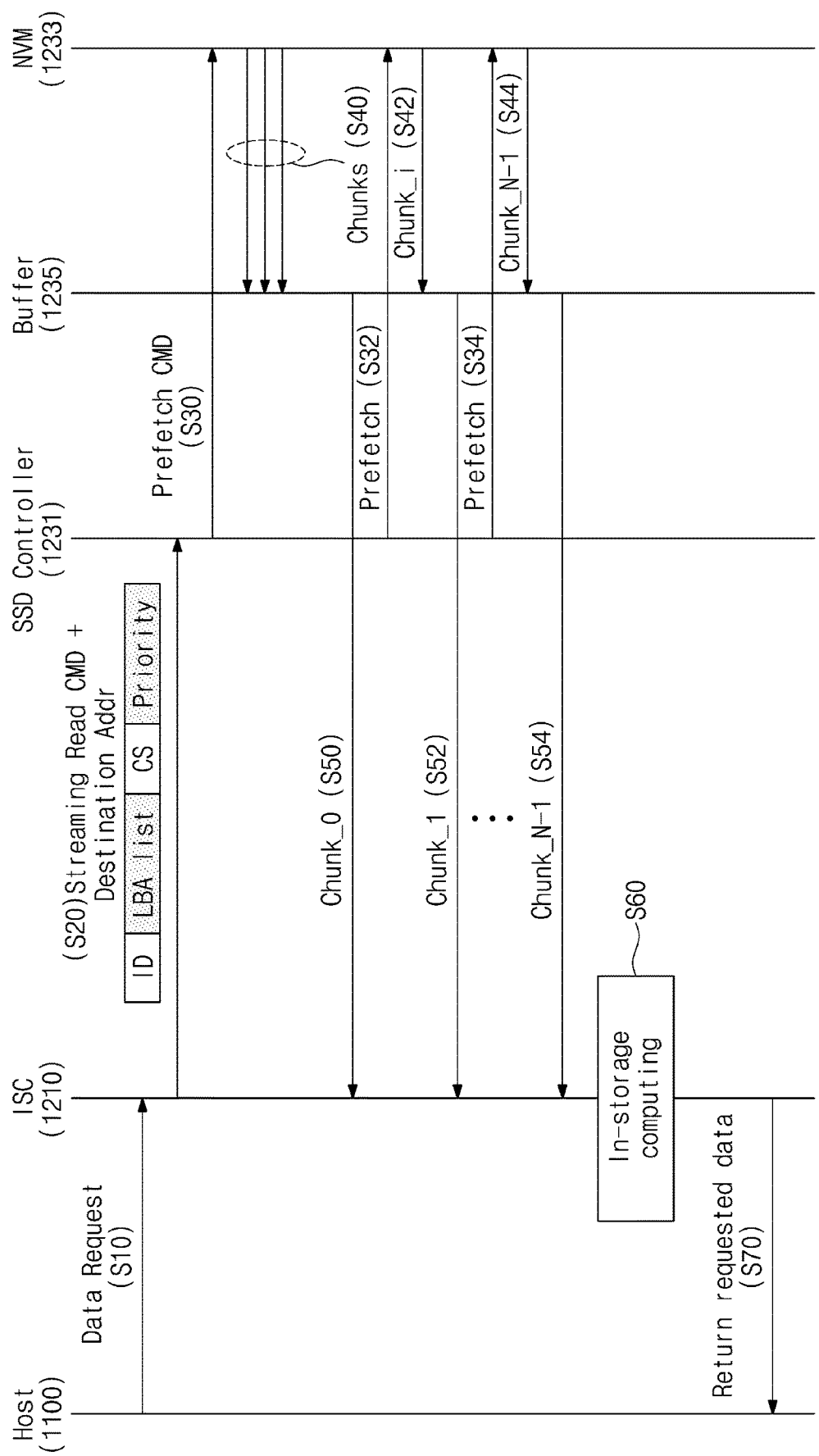
FIG. 10 illustrates a diagram of a streaming read command for in-storage computing performed in a storage device and a response of the storage device to the streaming read command, according to embodiments of the inventive concepts.

FIG. 10 illustrates a diagram of a streaming read command for in-storage computing performed in a storage device and a response of the storage device to the streaming read command, according to embodiments of the inventive concepts. Referring to FIG. 10, it is assumed that the host device 1100 requests specific data from the storage device 1200 (e.g., a data intensive work load operation such as a data base scan operation).

In operation S10, the host device 1100 transfers a data request (Data Request) to the storage device 1200. Here, the data request that the host device 1100 transfers may be a request for data base scan of data stored in the storage device 1200. Practically, the request for the data intensive workload may be transferred to the in-storage computing block 1210 provided in the storage device 1200. Here, a description is given as the host device 1100 transfers the data request. However, the data request may be issued from various peripheral devices such as for example from the CPU 1110, the GPU 1130, or the network interface card 1170 in the host device 1100, or from a field programmable gate array (FPGA), an ASIC, or the like provided as a peripheral device.

In operation S20, the in-storage computing block 1210 provided in the storage device 1200 transfers the streaming read command of embodiments of the inventive concepts to the SSD controller 1231 of the SSD 1230. In this case, the in-storage computing block 1210 may additionally provide a destination address together with the streaming read command. Here, the streaming read command may include a stream ID, an LBA list, a chunk size CS, and a priority.

In operation S30, the SSD controller 1231 transfers a prefetch command for reading data stored in the nonvolatile memory device 1233 in response to the streaming read command. The SSD controller 1231 controls the nonvolatile memory device 1233 such that data of the chunk size CS are read from the nonvolatile memory device 1233 by using address information collected from the LBA list.

In operation S40, the nonvolatile memory device 1233 outputs stream data of the chunk size CS to the buffer 1235 in response to a prefetch command from the SSD controller 1231. Data corresponding to a plurality of chunk sizes CS may be accumulated in the buffer 1235.

In operation S50, a streaming window registered at the virtual memory space 1161 may be accessed by the DMA engine 1211 of the in-storage computing block 1210. In this case, the access may be redirected to a position corresponding to the head pointer HP of the buffer 1235, and stream data corresponding to a chunk Chunk_0 enqueued in the buffer 1235 are transferred to the in-storage computing block 1210. In detail, the stream data corresponding to the chunk Chunk_0 output from the buffer 1235 may be transferred directly to the SRAM 1213 provided as a kernel memory.

In operation S32, the SSD controller 1231 transfers a prefetch command to the nonvolatile memory device 1233 in response to the data output of the buffer 1235. The SSD controller 1231 may perform a prefetch operation in consideration of stream data already transferred and stream data to be transferred next.

In operation S42, the nonvolatile memory device 1233 outputs stream data of the chunk size CS to the buffer 1235 under control of the SSD controller 1231.

In operation S52, a streaming window registered at the virtual memory space 1161 may be accessed by the DMA engine 1211 of the in-storage computing block 1210. In this case, the access may be redirected to a position corresponding to the head pointer HP of the buffer 1235, and stream data corresponding to a chunk Chunk_1 enqueued in the buffer 1235 are transferred to the in-storage computing block 1210. In detail, the stream data corresponding to the chunk Chunk_1 output from the buffer 1235 may be transferred directly to the SRAM 1213 provided as a kernel memory. The prefetch operation of the chunk unit and the transfer to the in-storage computing block 1210, which are described above, may be repeated until the last chunk Chunk_N−1 is repeated.

In operation S34, the SSD controller 1231 performs a prefetch operation from the nonvolatile memory device 1233 to the buffer 1235 in response to the data output of the buffer 1235. The SSD controller 1231 may perform a prefetch operation in consideration of stream data already transferred and stream data to be transferred next.

In operation S44, the nonvolatile memory device 1233 outputs the last stream data Chunk_N−1 defined in the LBA list to the buffer 1235 under control of the SSD controller 1231.

In operation S54, a streaming window registered at the virtual memory space 1161 may be accessed by the DMA engine 1211 of the in-storage computing block 1210. In this case, the access may be redirected to a position corresponding to the head pointer HP of the buffer 1235, and stream data corresponding to the last chunk Chunk_N−1 enqueued in the buffer 1235 are transferred to the in-storage computing block 1210.

In operation S60, the in-storage computing block 1210 collects the obtained stream data to perform in-storage computing. For example, the in-storage computing block 1210 may perform processing, such as a data base scan operation, on the obtained stream data. When the in-storage computing is completed, the in-storage computing block 1210 may finally select a value requested from the host device 1100.

In operation S70, the in-storage computing block 1210 may return only data selected by a result of the in-storage computing to the host device 1100.

Data input/output between the host device 1100 and the storage device 1200 described above only includes a data request of operation S10 and a return of requested data of operation S70. Accordingly, in the case of using a streaming access command according to embodiments of the inventive concepts, a decrease in a bandwidth of the storage device 1200 in which a data intensive workload operation is performed may be markedly improved.

Figure 11:
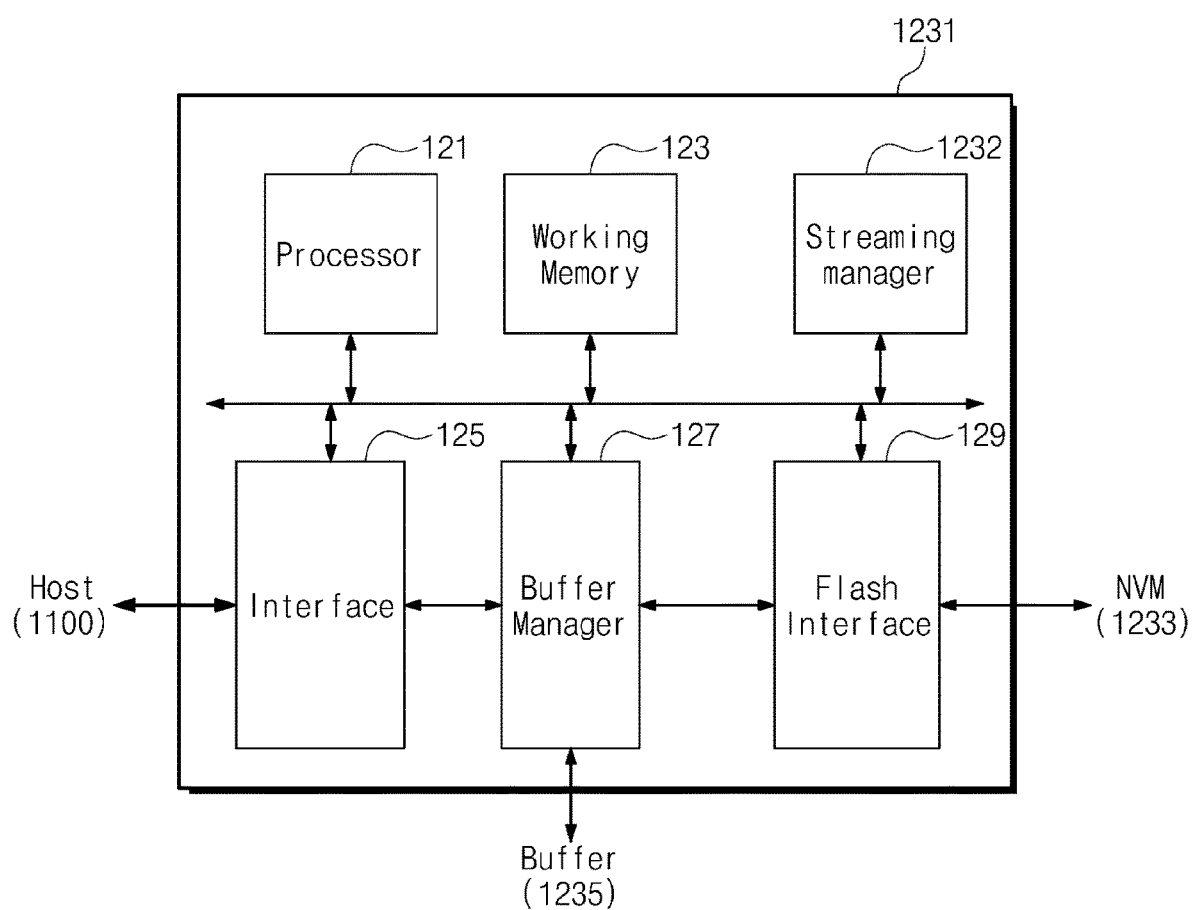
FIG. 11 illustrates a block diagram of an SSD controller of FIG. 5, according to embodiments of the inventive concepts.

FIG. 11 illustrates a block diagram of an SSD controller of FIG. 5, according to embodiments of the inventive concepts. Referring to FIG. 11, the SSD controller 1231 may include the processor 121, the working memory 123, the interface 125, the buffer manager 127, the flash interface 129, and the streaming manager 1232 implemented as a hardware block. Here, the processor 121, the working memory 123, the interface 125, the buffer manager 127, the flash interface 129 are substantially the same as those described with reference to FIG. 6, and thus, additional description will be omitted to avoid redundancy.

In the case where the streaming access command SA_CMD is received from the outside, the streaming access command SA_CMD is stored in a command register (not illustrated) of the interface 125. The interface 125 may notify the processor 121 that the read/write command is input to the processor 121, based on the stored command. In this case, the streaming manager 1232 may prefetch requested data by using an LBA list from the nonvolatile memory device 1233 to the buffer 1235 in the unit a chunk size in response to the streaming access command SA_CMD. In addition, the streaming manager 1232 transfers a status of the buffer 1235 to the outside and may allow a target device to freely access the buffer 1235.

For example, the streaming manager 1232 reads stream data corresponding to the LBA list from the nonvolatile memory device 1233. The streaming manager 1232 prefetches stream data from the nonvolatile memory device 1233 in the unit of the chunk size CS and loads the prefetched stream data onto the buffer 1235. The streaming manager 1232 may inform an external device of a head pointer and/or a tail pointer of the stream data loaded onto the buffer 1235. The streaming manager 1232 detects an access of an external device to the buffer 1235 to manage the head pointer and the tail pointer of the buffer 1235. In addition, the streaming manager 1232 may manage a streaming window of the virtual memory space 1161, onto which requested stream data will be loaded in the unit of a chunk size.

The SSD controller 1231 according to embodiments of the inventive concepts as shown in FIG. 11 may manage the buffer 1235 in the unit of the chunk size CS in response to the streaming access command SA_CMD. Status information of the buffer 1235 may be transferred to the outside of the SSD 1230 by the streaming manager 1232. The status information of the buffer 1235 transferred to the outside may be referenced for a DMA operation of a target device that transfers data in the unit of the chunk size CS.

Figure 12:
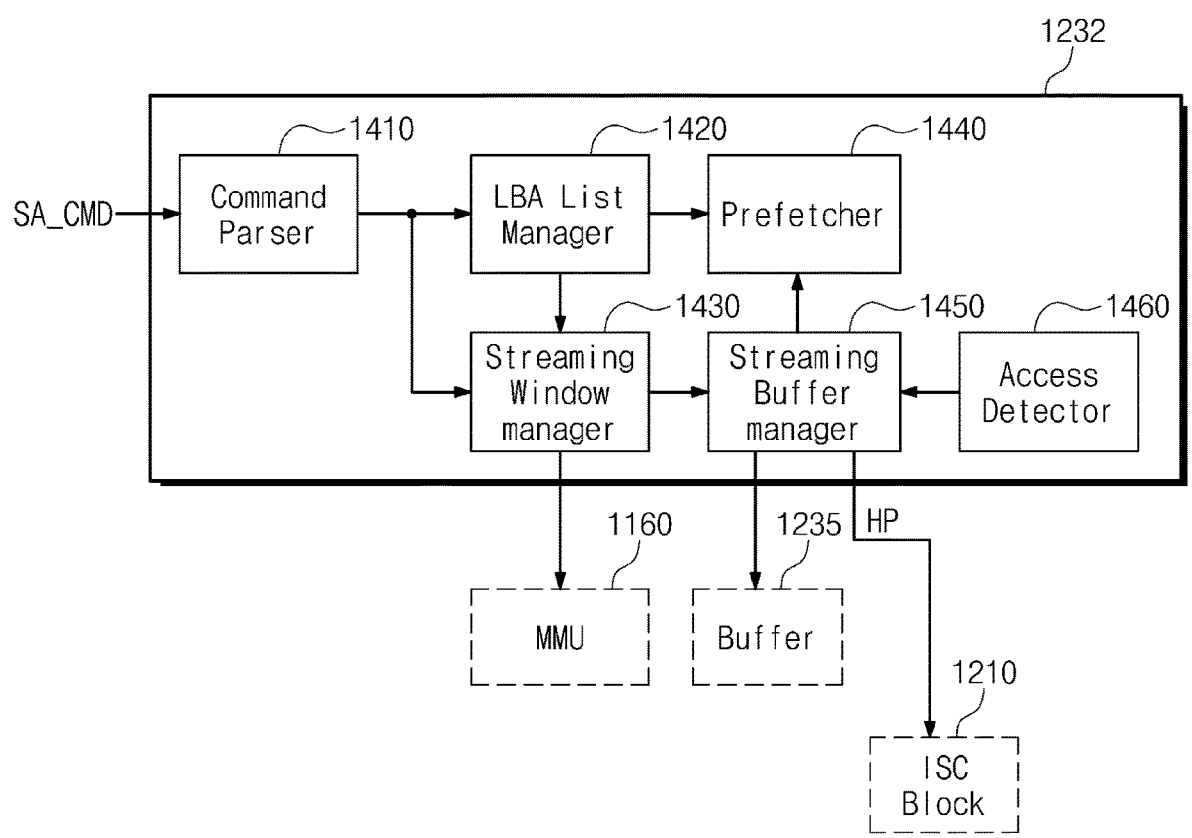
FIG. 12 illustrates a block diagram of a configuration of a streaming manager of FIG. 11.

FIG. 12 illustrates a block diagram of a configuration of a streaming manager of FIG. 11. Referring to FIG. 12, the streaming manager 1232 may include a command parser 1410, an LBA list manager 1420, a streaming window manager 1430, a prefetcher 1440, a streaming buffer manager 1450, and an access detector 1460.

The command parser 1410 may parse the streaming access command SA_CMD. The command parser 1410 may obtain information, such as LBA lists and a chunk size, from the parsed streaming access command SA_CMD. The command parser 1410 may provide the obtained information to the LBA list manager 1420 and the streaming window manager 1430.

The LBA list manager 1420 may manage the following information based on the LBA list obtained from the command parser 1410: the whole piece of data to be read from the nonvolatile memory device 1233 and data previously read (and thus enqueued in a circular queue).

The streaming window manager 1430 may manage a streaming window for providing stream data divided from the whole piece of data to an external device, based on the LBA list obtained from the command parser 1410 and the information managed by the LBA list manager 1420. For example, the streaming window manager 1430 may register a streaming window at a virtual memory space such that enqueued data are provided to the external device and may manage the registered streaming window. The streaming window manager 1430 may provide information for managing a streaming window to the memory management unit 1160 of the host device 1100.

The streaming buffer manager 1450 may manage a memory region of the buffer 1235, which is used for stream data. The streaming buffer manager 1450 may manage a status and an operation of the buffer 1235 such that stream data are enqueued and dequeued with regard to the streaming window managed by the streaming window manager 1430. For example, the streaming buffer manager 1450 may adopt a data structure of a circular queue, but embodiments of the inventive concepts are not limited to this example.

The prefetcher 1440 may prefetch data read from a memory device to the buffer 1235, based on information managed by the LBA list manager 1420. The prefetcher 1440 may prefetch data read from the nonvolatile memory device 1233 in the unit of a chunk size. The prefetcher 1440 may prefetch data to a memory region of the buffer 1235, which is directed by the streaming buffer manager 1450.

The access detector 1460 may detect that the external device accesses the streaming window. The access detector 1460 may detect an access of the external device or the host device 1100 to the buffer 1235, and the head pointer HP of the buffer 1235 may be updated according to a detection result. In addition, the prefetch operation from the nonvolatile memory device 1233 to the buffer 1235 may be performed according to the detection result of the access detector 1460.

In some embodiments, the streaming manager 1232 may be provided within the storage device 1200. For example, the SSD 1230 may perform the above-described streaming write and read operations under control of the SSD controller 1231. For example, the SSD controller 1231 may include the streaming manager 1232. In addition, the streaming manager 1232 may be implemented with a program code of software and/or firmware, and a processor core of the SSD controller 1231 may execute an instruction set of the program code to provide the streaming read operation and the streaming write operation.

In some embodiments, the streaming manager 1232 may be implemented with hardware circuits (e.g., an analog circuit, a logic circuit, an FPGA, and an ASIC) configured to perform the above-described operations. The hardware circuits may be included in the SSD controller 1231 or may be provided outside the SSD controller 1231. In some embodiments, the streaming manager 1232 may be provided in a hybrid form of software and hardware.

In some embodiments, the streaming manager 1232 may be provided outside the storage device 1200. For example, the streaming manager 1232 may be provided at an input/output stage of a storage device, thus existing between the storage device 1200 and an external device. The streaming manager 1232 may perform the above-described operations on data input to the storage device 1200 and data output from the storage device 1200. Besides, implementation of the streaming manager 1232 may be variously changed or modified.

In addition, the above descriptions may be provided with regard to a read operation and a write operation, but embodiments of the inventive concepts may be applied to any kind of operation accompanying communication between the storage device 1200 and the external device.

Figure 13:
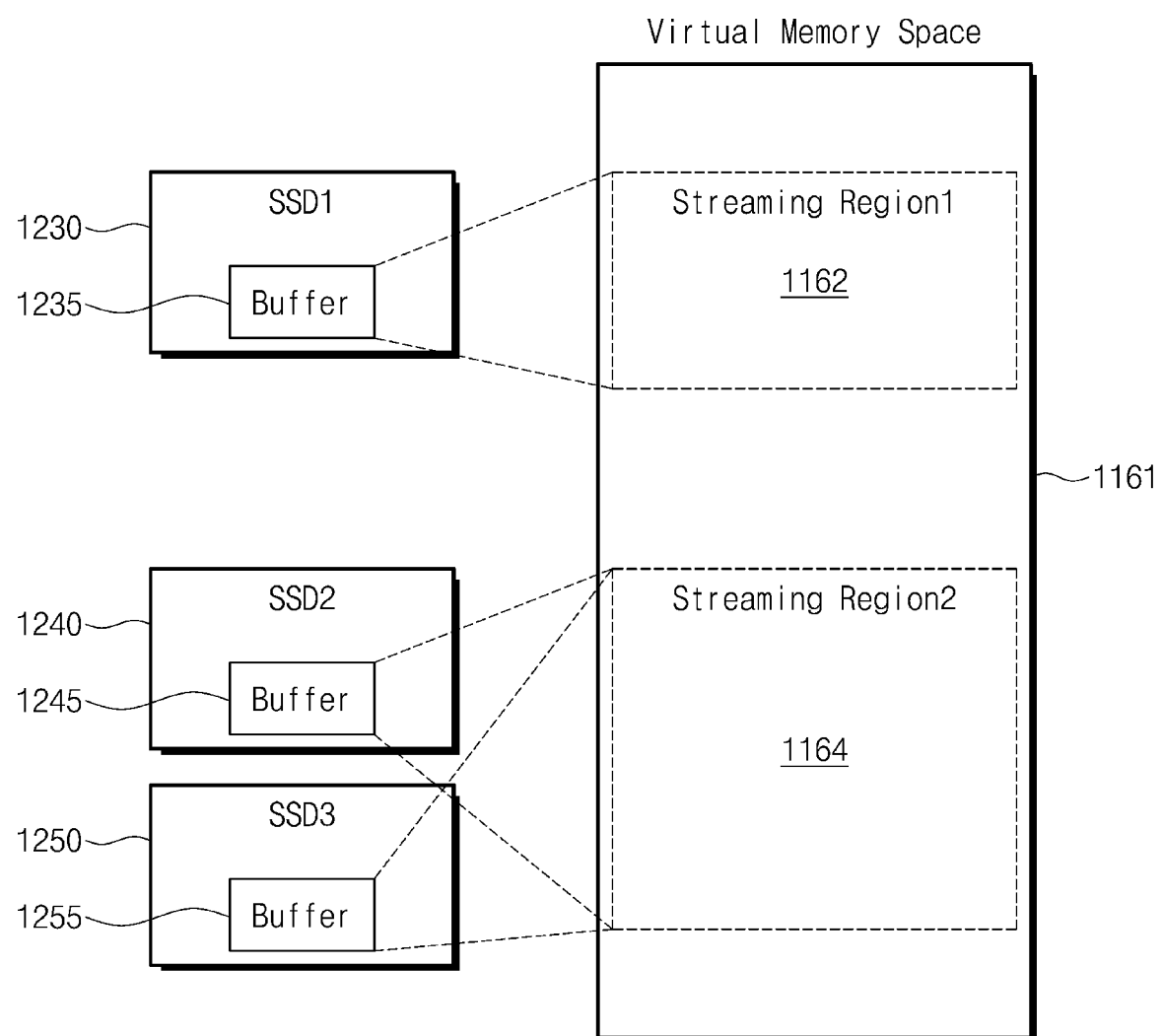
FIG. 13 illustrates a diagram showing a method of assigning a streaming region in a virtual memory space of a host according to embodiments of the inventive concepts.

FIG. 13 illustrates a diagram showing a method of assigning a streaming region in a virtual memory space of a host according to embodiments of the inventive concepts. Referring to FIG. 13, memory regions of buffers 1235, 1245, and 1255 of a plurality of SSDs including first SSD (SSD1)

1230, second SSD (SSD2) 1240, and third SSD (SSD3) 1250 may be registered at the virtual memory space 1161 of the host device 1100.

The buffer 1235 may be mapped onto a first streaming region (Streaming Region1) 1162 of the virtual memory space 1161 for the purpose of managing stream data enqueued in the buffer 1235 of the first SSD 1230. The number of streaming windows assigned to the first streaming region 1162 may be as much as (or correspond in number to) the number of streaming IDs of stream data to be stored in the buffer 1235. That is, the first streaming region 1162 may be assigned to a virtual memory that is used for the one first SSD 1230 to exchange stream data with the outside. When an access of an external device to the first streaming region 1162 of the virtual memory space 1161 is made, the access may be redirected to the buffer 1235 of the first SSD 1230 by the memory management unit 1160 of the host device 1100.

In contrast, the buffers 1245 and 1255 of the second and third SSDs 1240 and 1250 are mapped onto a second streaming region (Streaming Region2) 1164 of the virtual memory space 1161. That is, the one second streaming region 1164 may cover stream data that are input to or output from the buffers 1245 and 1255 of the second and third SSDs 1240 and 1250. For example, in the case where the second and third SSDs 1240 and 1250 are implemented in the form of RAID (Redundant Array of Independent Disks or Redundant Array of Inexpensive Disks), this mapping of the virtual memory space 1161 is possible.

In the case of the SSDs 1230, 1240, and 1250 using the NVMe-based interface, memory regions of the buffers 1235, 1245, and 1255 may be registered at the virtual memory space 1161 by using the base address register (BAR). In this case, when an external device accesses a virtual address assigned on the virtual memory space 1161, afterwards, an access to any one of the buffers 1235, 1245, and 1255 may be redirected by the memory management unit 1160. The in-storage computing block 1210, the host device 1100, or any other peripheral devices may share the buffers 1235, 1245, and 1255 through the virtual memory space.

Figure 14:
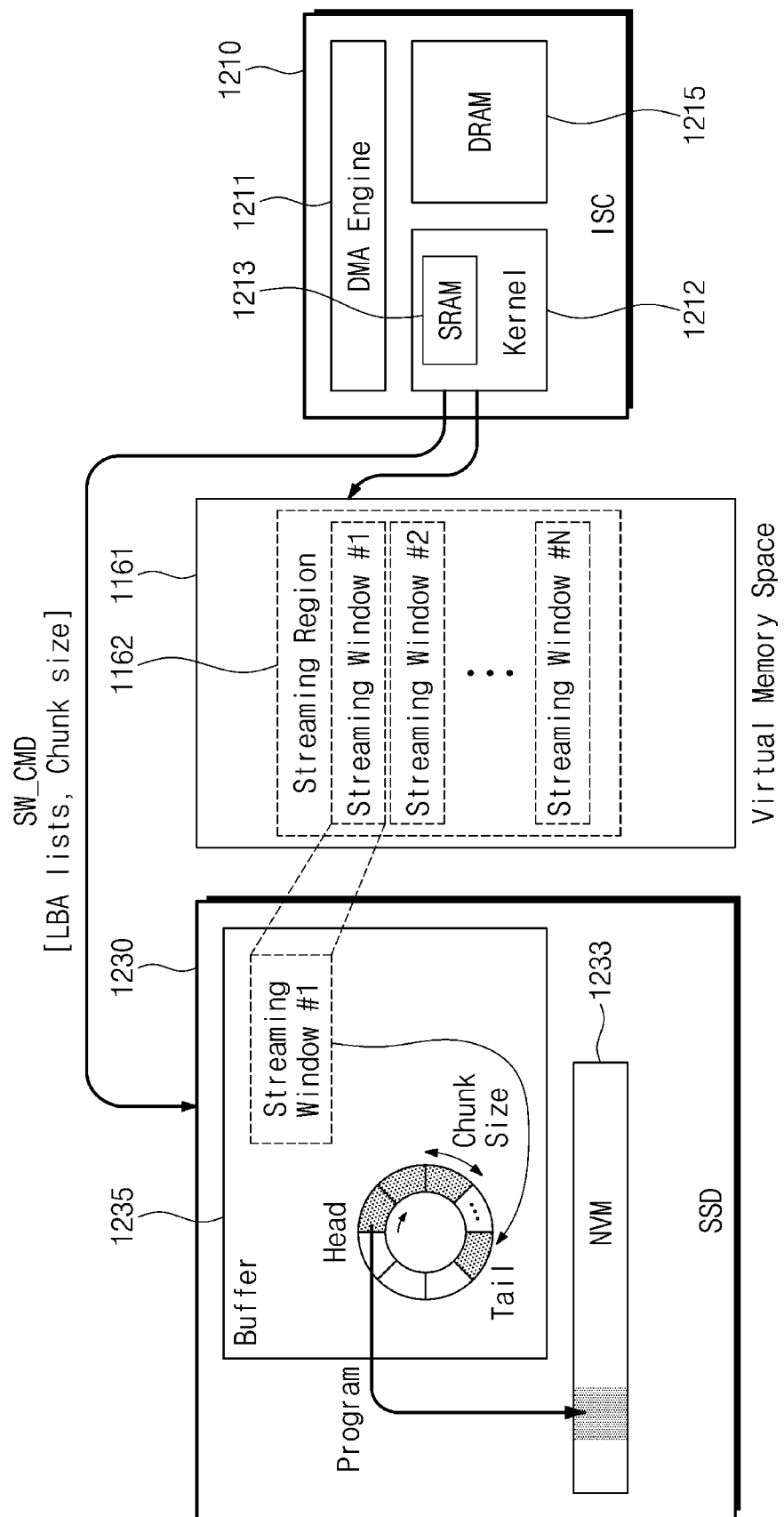
FIG. 14 illustrates a block diagram of a path over which data are transferred according to a streaming write command, according to embodiments of the inventive concepts.

FIG. 14 illustrates a block diagram of a path over which data are transferred according to a streaming write command, according to embodiments of the inventive concepts. Referring to FIG. 14, the SSD 1230 may program data loaded onto the buffer 1235 in the nonvolatile memory device 1233 based on LBA lists of the streaming write command SW_CMD.

When a streaming write operation is requested from a device such as the host device 1100, a peripheral device, or the in-storage computing block 1210, the streaming write command SW_CMD may be transferred to the SSD 1230. When the SSD 1230 enters a ready state in response to the steaming write command SW_CMD, the in-storage computing block 1210 may transfer stream data as a target to the streaming window Streaming Window #1 assigned in the virtual memory space 1161. Streaming region 162 is shown in FIG. 14 as including Streaming Window #1, and Streaming Window #2 through Streaming Window #N. In this case, the streaming window Streaming Window #1 may be redirected to the buffer 1235 by the memory management unit 1160 of the host device 1100.

Stream data are stored in the buffer 1235 in the unit of a chunk size. In an embodiment, in the case where the buffer 1235 is managed in the form of a ring buffer, even in the write operation, the head pointer HP and the tail pointer TP of the buffer 1235 may move in the unit of a chunk size. It should be well understood that the data structure of the buffer 1235 may be variously changed or modified in other embodiments of the inventive concepts.

The manner to manage stream data in response to the steaming write command SW_CMD is briefly described above. The streaming write operation may be performed substantially in reverse order to the streaming read operation described with respect to FIG. 8.

Figure 15:
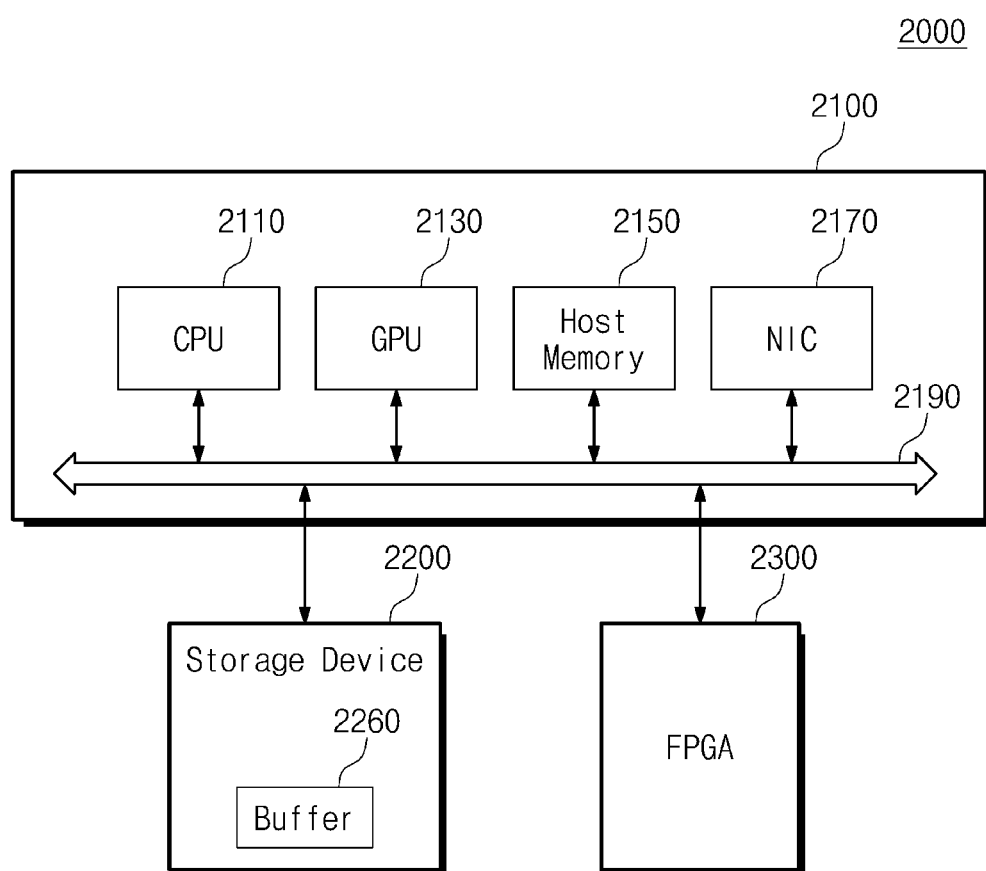
FIG. 15 illustrates a block diagram of a computing system including a storage device according to embodiments of the inventive concepts.

FIG. 15 illustrates a block diagram of a computing system including a storage device according to embodiments of the inventive concepts. Referring to FIG. 15, a computing system 2000 may include a host device 2100, a storage device 2200, and an FPGA 2300. Here, a function and a configuration of the host device 2100 are substantially the same as the function and the configuration of the host device 1100 of FIG. 1, and thus, additional description will be omitted to avoid redundancy.

The storage device 2200 may enqueue stream data in a buffer 2260 in the unit of a requested chunk size in response to the streaming access command SA_CMD provided from the outside. Here, the streaming read command SR_CMD and the steaming write command SW_CMD may be collectively referred to as the "streaming access command SA_CMD". The storage device 2200 may be storage including solid state drives (SSD), secure digital (SD®) cards, or embedded multimedia cards (eMMC®).

In particular, a memory region of the buffer 2260 may be mapped onto a virtual memory space of the host 2100 and may be shared by devices constituting the computing system 2000. The buffer 2260 may be mapped onto a virtual address corresponding to a streaming window of the virtual memory space. The memory region of the buffer 2260 may be shared in such a way that the host 2100, the FPGA 2300, or peripheral devices access a streaming window of the virtual memory space. The streaming access command SA_CMD may include information of an LBA list, a stream ID, a chunk size, a priority, etc. It should be well understood that the FPGA 2300 is only an exemplary component of a device to process stream data that are exchanged with the storage device 2200. The FPGA 2300 may be implemented with various processors, intellectual property (IP), or an ASIC capable of processing stream data.

The FPGA 2300 may process stream data that the storage device 2200 outputs in response to the streaming access command SA_CMD and may transfer a result value of the processing to the host 2100. For example, the storage device 2200 may load stream data onto the buffer 2260 in the unit of a requested data size (chunk size) in response to the streaming read command SR_CMD. In this case, the FPGA 2300 may receive the stream data loaded onto the buffer 2260 by using a streaming window assigned in the virtual memory space. In this case, a bandwidth between the host 2100 and the storage device 2200 may not decrease due to a transfer of the stream data. Accordingly, the operation of the FPGA 2300 may make it possible to markedly improve (i.e., minimize) a decrease in a bandwidth due to the exchange of stream data between the storage device 2200 and the host 2100.

A structure of the computing system 2000 according to embodiments of the inventive concepts is briefly described above. In these embodiments, the FPGA 2300 that processes a data intensive workload is positioned outside the storage device 2200. Here, it should be well understood that the streaming access command SA_CMD is generated by the host 2100 or the FPGA 2300 or within the storage device 2200. The streaming access command SA_CMD may allow the computing system 2000 of the inventive concepts to process stream data efficiently.

Figure 16:
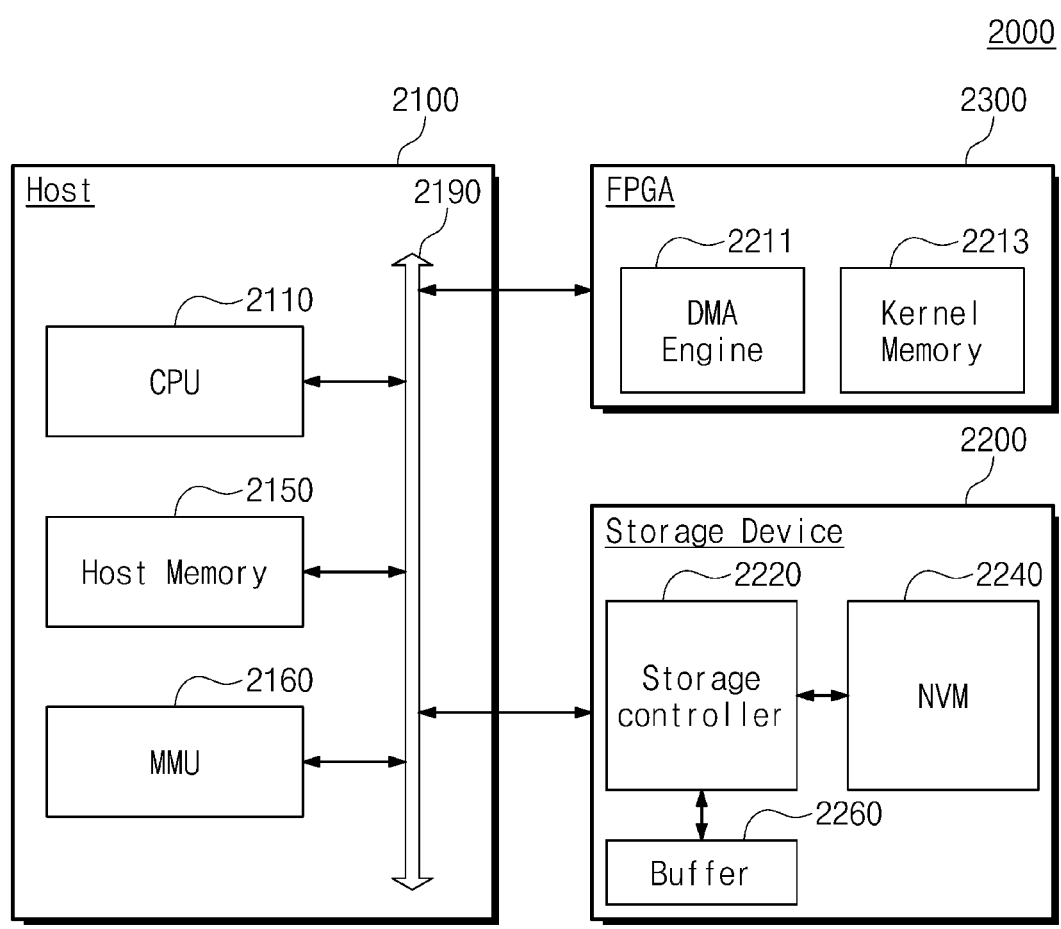
FIG. 16 illustrates a block diagram of an exemplary configuration of a host, a storage device, and an FPGA of FIG. 15.

FIG. 16 illustrates a block diagram of an exemplary configuration of a host, a storage device, and an FPGA of FIG. 15. Referring to FIG. 16, unlike the storage device 1200 of FIGS. 1 or 2, the storage device 2200 and the FPGA 2300 are provided within the computing system 2000 as individual devices.

According to the inventive concepts, the host 2100 may include a central processing unit 2110, a host memory 2150, an interface circuit 2190, and a memory management unit 2160 for the purpose of processing stream data. Here, it should be understood that the host 2100 may further include components such as a graphics processing unit 2130 and a network interface card 2170 such as shown in FIG. 15. The central processing unit 2110, the host memory 2150, and the interface circuit 2190 are substantially the same as those of FIG. 2, and thus, additional description will be omitted to avoid redundancy.

A streaming window that may allow a DMA engine 2211 of the FPGA 2300 to access a memory region of the buffer 2260 in the storage device 2200 may be assigned in a virtual memory space of the host 2100. The host 2100 may include the memory management unit 2160 for the purpose of managing a streaming window mapped onto the virtual memory space. In booting or initialization of the computing system 2000, the memory management unit 2160 may register the buffer 2260 of the storage device 2200 at the virtual memory space to provide memory sharing for an input/output of stream data.

The storage device 2200 includes the storage controller 2220, the nonvolatile memory device 2240 and the buffer 2260. The storage device 2200 loads data read from the nonvolatile memory device 2240 onto the buffer 2260 in the unit of a chunk size in response to the streaming read command SR_CMD. Alternatively, the storage device 2200 programs data read from the buffer 2260 to the nonvolatile memory device 2240 in the unit of a chunk size in response to the steaming write command SW_CMD. The buffer 2260 is mapped onto the virtual memory space of the host 2100, and thus, the buffer 2260 is accessible by the DMA engine 2211 of the FPGA 2300.

In an embodiment, the FPGA 2300 may include the DMA engine 2211 and a kernel memory 2213. For example, the FPGA 2300 may be implemented with one or more processor cores, an FPGA, etc. The FPGA 2300 may provide the streaming access command SA_CMD of the inventive concepts to the storage device 2200 in response to a request of the host 2100. The FPGA 2300 may process stream data transferred from the storage device 2200 and may transfer the processed data to the host 2100. The DMA engine 2211 may read stream data of a chunk size loaded onto the buffer 2260 of the storage device 2200 and may transfer the read data to the kernel memory 2213.

According to embodiments of the inventive concepts, it is possible to transfer stream data from a storage device to a target device only by using a single stream access command. Accordingly, a decrease in a bandwidth of an input/output channel of the storage device and a transfer delay time may be minimized when the stream data are transferred, and the efficiency of in-storage computing may be improved.

While the inventive concepts have been described with reference to exemplary embodiments thereof, it should be apparent to those of ordinary skill in the art that various changes and modifications may be made thereto without departing from the spirit and scope of the inventive concepts as described.

What is claimed is:

1. A storage device comprising:
a first solid state drive (SSD) including a first nonvolatile memory and a first buffer, the first SSD being configured to receive a first streaming access command including a first logical block address (LBA) list and a first chunk size, to fetch a first stream data from the first nonvolatile memory requested according to the first LBA list and the first chunk size, and to sequentially load the first stream data onto the first buffer;
a second solid state drive (SSD) including a second nonvolatile memory and a second buffer, the second SSD being configured to receive a second streaming access command including a second logical block address (LBA) list and a second chunk size, to fetch a second stream data from the second nonvolatile memory requested according to the second LBA list and the second chunk size, and to sequentially load the second stream data onto the second buffer; and
an in-storage computing block configured to sequentially read the first stream data loaded onto the first buffer in units of the first chunk size using mapping of the first buffer,
wherein the first buffer is registered at a first streaming region of a virtual memory space in an external device that is separate from the storage device,
the second buffer is registered at a second streaming region of the virtual memory space in the external device, and
the in-storage computing block is configured to access the first streaming region in the virtual memory space of the external device to read the first stream data loaded into the first buffer.

2. The storage device of claim 1, wherein the first SSD is configured to fetch the first stream data from the first nonvolatile memory without an additional command.

3. The storage device of claim 1, wherein the first streaming access command includes a first stream identifier (ID) of the first stream data and first priority,
the first LBA list corresponds to all logical addresses of the first stream data,
the first chunk size defines a management unit of the first stream data, and
the first priority is assigned to the first stream identifier.

4. The storage device of claim 1, wherein the in-storage computing block is configured to perform a data base scan operation on the first stream data that is read in the units of the first chunk size.

5. The storage device of claim 1, wherein the first SSD receives the first streaming access command generated by the external device or by the in-storage computing block.

6. The storage device of claim 1, wherein the first SSD includes a first controller that includes a first streaming manager configured to manage the first nonvolatile memory and the first buffer based on the first streaming access command.

7. The storage device of claim 1, wherein the first SSD is configured to communicate with the external device in compliance with a PCIe or NVMe interface protocol.

8. The storage device of claim 1, wherein the in-storage computing block accesses the second streaming region in the virtual memory space of the external device to read the second stream data loaded in the second buffer.

9. The storage device of claim 8, wherein the in-storage computing block sequentially reads the second stream data loaded onto the second buffer in units of the second chunk size using mapping of the second buffer.

10. A storage device comprising:
an interface configured to communicate commands and exchange data with a host device disposed separate from the storage device;
a first solid state drive (SSD) including a first nonvolatile memory and a first buffer, the first SSD configured to sequentially load first stream data from the first nonvolatile memory to the first buffer responsive to a first streaming access command received at the interface;
a second solid state drive (SSD) including a second nonvolatile memory and a second buffer, the second SSD configured to sequentially load second stream data from the second nonvolatile memory to the second buffer responsive to a second streaming access command received at the interface,
wherein the first buffer is registered at a first streaming region of a virtual memory space in the host device, and the second buffer is registered at a second streaming region of the virtual memory space in the host device; and
a direct memory access (DMA) engine configured to access the first stream region of the virtual memory space in the host device to read the first stream data loaded in the first buffer,
wherein the interface is configured to send the read first stream data to the host device.

11. The storage device of claim 10, wherein the first streaming access command comprises a first chunk size that defines a management unit of the first stream data and a first logical block (LBA) list that corresponds to all logical addresses of the first stream data, and the first SSD is configured to load the first stream data to the first buffer in units of first chunk size.

12. The storage device of claim 11, wherein the DMA engine is further configured to access the second stream region of the virtual memory space in the host device to read the second stream data loaded in the second buffer, and the interface is further configured to send the read second stream data to the host device.

13. The storage device of claim 12, wherein the second streaming access command comprises a second chunk size that defines a management unit of the second stream data, and the second SSD is configured to load the second stream data to the second buffer in units of second chunk size.

14. The storage device of claim 11, further comprising an in-storage computing block including the DMA engine, the in-storage computing block configured to perform a data base scan operation on the first stream data read in the units of the first chunk size.

15. The storage device of claim 10, wherein the first streaming access command comprises first priority and a first stream identifier of the first stream data, wherein the first priority is assigned to the first stream identifier.

16. The storage device of claim 10, wherein the interface is configured to communicate with the host device in compliance with a PCIe or NVMe interface protocol.

17. The storage device of claim 10, further comprising a third solid state drive (SSD) including a third nonvolatile memory and a third buffer, the third SSD configured to sequentially load third stream data from the third nonvolatile memory to the third buffer responsive to a third streaming access command received at the interface,
wherein the third buffer is registered at the second streaming region of the virtual memory space in the host device.

18. The storage device of claim 10, wherein the first SSD comprises an SSD controller configured to register the first buffer at the first streaming region of the virtual memory space in the host device by setting a base address register (BAR) of the host device.

19. A storage device comprising:
a first solid state drive (SSD) including a first nonvolatile memory and a first buffer, the first SSD being configured to receive a first streaming access command including a first logical block address (LBA) list and a first chunk size, to fetch a first stream data from the first nonvolatile memory requested according to the first LBA list and the first chunk size, and to sequentially load the first stream data onto the first buffer;
a second solid state drive (SSD) including a second nonvolatile memory and a second buffer, the second SSD being configured to receive a second streaming access command including a second logical block address (LBA) list and a second chunk size, to fetch a second stream data from the second nonvolatile memory requested according to the second LBA list and the second chunk size, and to sequentially load the second stream data onto the second buffer; and
an in-storage computing block configured to sequentially read the first stream data loaded onto the first buffer in units of the first chunk size using mapping of the first buffer,
wherein the first buffer is registered at a first streaming region of a virtual memory space of an external device,
the second buffer is registered at a second streaming region of the virtual memory space of the external device, and
the first streaming access command includes a first stream identifier (ID) of the first stream data and first priority, the first LBA list corresponds to all logical addresses of the first stream data, the first chunk size defines a management unit of the first stream data, and the first priority is assigned to the first stream identifier.

* * * * *